United States Patent
Kesiboyana et al.

(10) Patent No.: US 11,948,128 B2
(45) Date of Patent: *Apr. 2, 2024

(54) INTELLIGENT PREPROCESSING ROUTING TO DECISIONING SERVICES

(71) Applicant: Capital One Services, LLC, McLean, VA (US)

(72) Inventors: Satish Kesiboyana, Plano, TX (US); Rajaboopathy Vijayaraghavan, Carrollton, TX (US); Nithya Subramanian, Plano, TX (US); Thomas Sickert, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,003

(22) Filed: Dec. 8, 2021

(65) Prior Publication Data

US 2022/0092691 A1 Mar. 24, 2022

Related U.S. Application Data

(63) Continuation of application No. 16/882,112, filed on May 22, 2020, now Pat. No. 11,210,687.

(Continued)

(51) Int. Cl.
  *G06Q 40/00* (2023.01)
  *G06F 9/445* (2018.01)
  (Continued)

(52) U.S. Cl.
  CPC ......... *G06Q 10/10* (2013.01); *G06F 9/44505* (2013.01); *G06F 9/54* (2013.01); *G06F 9/547* (2013.01); *G06F 16/258* (2019.01); *G06F 16/9558* (2019.01); *G06F 16/9562* (2019.01); *G06F 18/24* (2023.01); *G06F 21/53* (2013.01);
  (Continued)

(58) Field of Classification Search
  None
  See application file for complete search history.

(56) References Cited

U.S. PATENT DOCUMENTS 7,461,080 B1 * 12/2008 Tucker ................ G06F 11/3476
7,620,597 B2    11/2009 Eze
(Continued)

FOREIGN PATENT DOCUMENTS

WO    2015136503 A1    9/2015

*Primary Examiner* — Olabode Akintola
(74) *Attorney, Agent, or Firm* — Sterne, Kessler, Goldstein & Fox P.L.L.C.

(57) ABSTRACT

The system and methods described herein allow users to give their applicant information when seeking to purchase a good with financing from multiple potential lenders, and may be pre-screened by one or more rule sets implemented by a marketplace client in an eligibility analysis to ultimately submit applicant information to a subset of the multiple potential lenders which are found to be suitable for lending to an applicant based on the applicant information, wherein lender microservices are then run in a jailed, firewalled, and self-contained, autonomous environment, and the results of said lender microservices are reported to the user and may be used to change the one or more rule sets implemented by the marketplace client for future pre-screening of applicants.

20 Claims, 11 Drawing Sheets

Related U.S. Application Data

(60) Provisional application No. 62/852,202, filed on May 23, 2019.

(51) Int. Cl.

| | | |
|---|---|---|
| *G06F 9/54* | (2006.01) | |
| *G06F 16/25* | (2019.01) | |
| *G06F 16/955* | (2019.01) | |
| *G06F 18/24* | (2023.01) | |
| *G06F 21/53* | (2013.01) | |
| *G06F 21/60* | (2013.01) | |
| *G06F 21/62* | (2013.01) | |
| *G06F 40/103* | (2020.01) | |
| *G06F 40/174* | (2020.01) | |
| *G06F 40/18* | (2020.01) | |
| *G06N 3/02* | (2006.01) | |
| *G06N 5/025* | (2023.01) | |
| *G06N 20/00* | (2019.01) | |
| *G06Q 10/10* | (2023.01) | |
| *G06Q 20/38* | (2012.01) | |
| *G06Q 20/40* | (2012.01) | |
| *G06Q 30/018* | (2023.01) | |
| *G06Q 30/0201* | (2023.01) | |
| *G06Q 30/0601* | (2023.01) | |
| *G06Q 40/02* | (2023.01) | |
| *G06Q 40/03* | (2023.01) | |
| *H04L 9/08* | (2006.01) | |
| *H04L 9/40* | (2022.01) | |
| *H04L 67/01* | (2022.01) | |
| *G06F 8/65* | (2018.01) | |
| *G06F 8/71* | (2018.01) | |
| *G06K 7/14* | (2006.01) | |
| *G06Q 50/26* | (2012.01) | |

(52) U.S. Cl.
CPC .......... *G06F 21/602* (2013.01); *G06F 21/604* (2013.01); *G06F 21/6227* (2013.01); *G06F 21/6245* (2013.01); *G06F 40/103* (2020.01); *G06F 40/174* (2020.01); *G06F 40/18* (2020.01); *G06N 3/02* (2013.01); *G06N 5/025* (2013.01); *G06N 20/00* (2019.01); *G06Q 20/382* (2013.01); *G06Q 20/4014* (2013.01); *G06Q 30/0185* (2013.01); *G06Q 30/0206* (2013.01); *G06Q 30/0601* (2013.01); *G06Q 30/0613* (2013.01); *G06Q 30/0619* (2013.01); *G06Q 30/0637* (2013.01); *G06Q 30/0643* (2013.01); *G06Q 40/02* (2013.01); *G06Q 40/03* (2023.01); *H04L 9/0825* (2013.01); *H04L 63/0435* (2013.01); *H04L 63/08* (2013.01); *H04L 63/0815* (2013.01); *H04L 63/102* (2013.01); *H04L 63/123* (2013.01); *H04L 63/166* (2013.01); *H04L 63/168* (2013.01); *H04L 67/01* (2022.05); *G06F 8/65* (2013.01); *G06F 8/71* (2013.01); *G06F 2221/2107* (2013.01); *G06K 7/1417* (2013.01); *G06Q 50/265* (2013.01); *G06Q 2220/00* (2013.01); *H04L 9/0822* (2013.01)

(56) References Cited

U.S. PATENT DOCUMENTS

| | | |
|---|---|---|
| 7,630,933 B2 | 12/2009 | Peterson et al. |
| 7,908,210 B2 | 3/2011 | Huber et al. |
| 8,392,294 B2 | 3/2013 | Mac Innis |
| 8,909,551 B2 | 12/2014 | Pawlusiak et al. |
| 10,033,702 B2 | 7/2018 | Ford et al. |
| 10,210,570 B2 | 2/2019 | Bennett et al. |
| 10,243,743 B1 | 3/2019 | Madisetti et al. |
| 2005/0187860 A1 | 8/2005 | Peterson et al. |
| 2006/0178983 A1 | 8/2006 | Nice et al. |
| 2007/0244808 A1 | 10/2007 | Eze |
| 2010/0023448 A1 | 1/2010 | Eze |
| 2011/0112946 A1* | 5/2011 | Porter ............ H04L 63/102 705/35 |
| 2011/0270659 A1 | 11/2011 | Crites |
| 2011/0313884 A1 | 12/2011 | Eze |
| 2012/0179753 A1 | 7/2012 | Welingkar et al. |
| 2013/0218752 A1* | 8/2013 | Pawlusiak ............ G06Q 40/025 705/38 |
| 2014/0020068 A1 | 1/2014 | Desai et al. |
| 2014/0164774 A1 | 6/2014 | Nord et al. |
| 2014/0279399 A1 | 9/2014 | Shidler et al. |
| 2015/0025950 A1 | 1/2015 | Yu |
| 2015/0170233 A1 | 6/2015 | Lisitsa |
| 2016/0042451 A1 | 2/2016 | Raessler et al. |
| 2016/0050272 A1 | 2/2016 | Raduchel |
| 2016/0125041 A1 | 5/2016 | Smith et al. |
| 2016/0232546 A1 | 8/2016 | Ranft et al. |
| 2016/0314487 A1 | 10/2016 | Martin et al. |
| 2016/0350850 A1 | 12/2016 | Shields et al. |
| 2018/0040064 A1 | 2/2018 | Grigg et al. |
| 2018/0158139 A1 | 6/2018 | Krajicek et al. |
| 2019/0087847 A1 | 3/2019 | Peasley et al. |
| 2019/0102836 A1 | 4/2019 | Wales et al. |
| 2019/0114705 A1 | 4/2019 | Wong et al. |
| 2019/0130480 A1 | 5/2019 | Brewbacker et al. |
| 2019/0333142 A1 | 10/2019 | Thomas |
| 2020/0043066 A1 | 2/2020 | Obaidi |
| 2020/0311808 A1 | 10/2020 | Srivastava et al. |
| 2020/0372499 A1 | 11/2020 | Sundaram et al. |
| 2020/0372574 A1 | 11/2020 | Sundaram et al. |
| 2020/0372575 A1 | 11/2020 | Kesiboyana et al. |
| 2020/0372576 A1 | 11/2020 | Sundaram et al. |

* cited by examiner

Overview

Example for one lender
300

INTELLIGENT PREPROCESSING ROUTING TO DECISIONING SERVICES

CROSS-REFERENCE TO RELATED APPLICATIONS

This is a Continuation Application of U.S. Utility application Ser. No: 16/882,112 filed May 22, 2020, which claims priority to U.S. Provisional Application No: 62/852,202 filed May 23, 2019. The contents of each of the applications is incorporated herein by reference in their entirety.

BACKGROUND

A substantial number of goods purchases such as those of commercial products (e.g. vehicles), or real property, involve financing, which increases the total cost of the purchase, because in addition to the price of the respective good, the consumer is paying for the cost of credit (interest and ancillary costs). In making such a purchase, the consumer has an incentive to minimize these additional costs. Typically, consumers obtain financing for the purchase of a good of interest upon visiting a seller of such a good (e.g. for the purchase of a car vehicle, customers obtain financing upon visiting a dealer). At such a visit, sellers often run credit checks on the consumer, to check the consumer's credit in deciding to offer a loan application. If the consumer does not buy the good, his or her credit score may be affected, and can drop a consumer's score by several points, which may remain on the consumer's credit reports for several years. Furthermore, having loan inquiries but no loan on the consumer's credit report may make it appear as if the consumer has been turned down for the loan, and can affect future credit decisions.

Alternatively, in the event that the consumer does buy the good from a seller with financing, the consumer still faces several hurdles in optimally financing his or her purchase. There may be a lack of familiarity between the sellers and banks which pre-approve loans, resulting in higher interest rates, sub-optimal loan terms, inaccurate assessment, or redundant information needing to be shared separately with the seller and the bank, often making for a frustrating buying experience. Further, even if the consumer is approved for a bank loan, communications are often not integrated with the processing of a third-party bank loan. In addition to the possibility of the interest rate or other loan terms not being optimal and appropriately matched to the good, among other factors, the consumer faces the added inconvenience of having to communicate with two separate parties to complete the purchase of the commodity.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Provided herein are system, apparatus, device, method and/or computer program product embodiments, and/or combinations and sub-combinations thereof, for utilizing a multi-lender architecture.

The multi-lender architecture may include interactive microservices that communicate together in a bi-directional manner to create a normalized process for the purchase of a good, such as commercial goods/products (e.g. a vehicle, appliances, etc.), or real property. The purchase of vehicles are used as an example of a product purchase in the embodiments described herein. In such an example, the architecture may include a first assessment of eligibility. This first assessment assesses a potential buyer's suitability, based on inputted background information, for being a prospective applicant to obtain financing for the purchase from various specific lenders, per rules given by a marketplace client (e.g. a client with a platform for sales connecting buyers with sellers). This first assessment of eligibility is then followed by a second eligibility assessment wherein the potential buyer's information is sent to the specific lenders, and prequalification eligibility for a loan for making the purchase is assessed per specific lender rules. This second assessment is then followed by calculating pricing details for loans by specific lenders that would be offered for a consumer's particular financial credentials, across a range of multiple vehicles. In existing marketplace solutions for facilitating such purchases, buyers and lenders/sellers often have to directly handle negotiations after an initial assessment. In contrast, with the multi-lender architecture of the embodiments in the present disclosure, an end-to-end intermediating architecture is presented. Consumer-specific credentials are tailored to be submitted to lenders found to be suitable for the consumer, and run against custom lender-specific requirements. The result is assessed within the architecture, guiding both parties through the steps of pre-lender eligibility, lender prequalification eligibility, lender product eligibility, product pricing, and finally the linking of a resulting credit application for the purchase of said goods or property.

Figure 1:
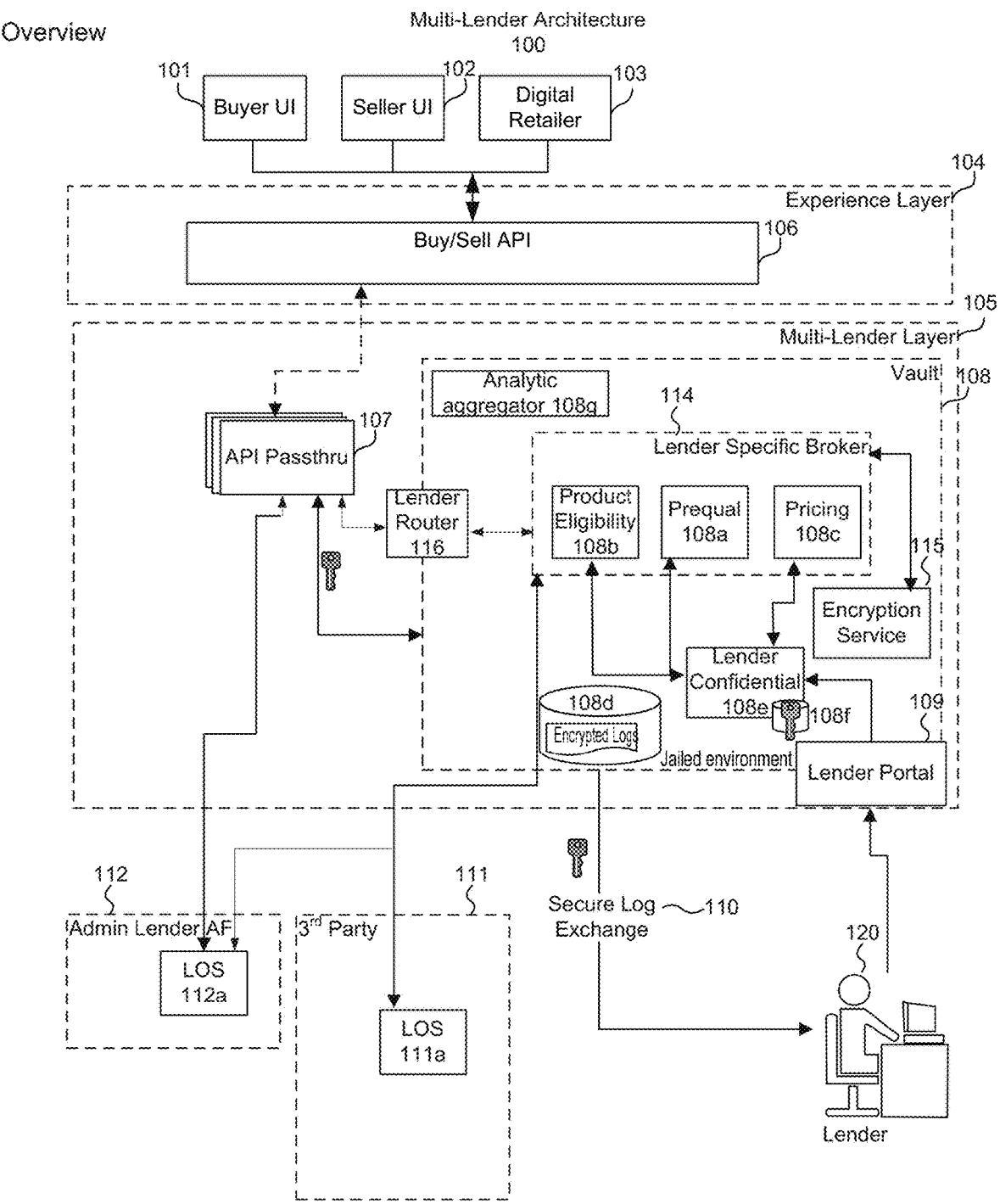
FIG. 1 is a block diagram of a multi-lender platform architecture, comprising of an Experience Layer and a Multi-lender Layer, according to a plurality of embodiments.

FIG. 1 is a block diagram illustrating the multi-lender architecture 100 according to an embodiment dealing with the example of a product purchase (e.g. a vehicle). The upper portion of the architecture, as shown in FIG. 1, includes the Experience Layer 104, which defines the portion of the architecture which the user utilizes to interface with the back-end of the architecture, and which relays information from the back-end of the architecture to the user. The back-end of the architecture comprises the Multi-Lender Layer 105. The Experience Layer 104 may be accessed by numerous user-facing interface applications, including Buyer UI 101, Seller UI 102, or Digital Retailer 103. For example, a consumer seeking to purchase a vehicle can log in from the Buyer UI 101 interface to the Experience layer 104, to access a plurality of prospective lenders and an inventory of vehicles displayed in a marketplace. Availability of a vehicle for each lender may vary based on relationships between each lender and associated dealerships or lender specific policies based on credit score, vehicle, geography, etc. Similarly, following the same example, a dealer may log in to the Experience Layer 104 using the Seller UI 102 interface, and a customer/seller/administrator of a digital retailer may log in to the Experience Layer 104 using the Digital Retailer 103 interface, respectively. Regardless of the interface application used, the Experience Layer is accessed through the Buy/Sell API 106. In this manner, the Experience Layer 104, through the Buy/Sell API 106, is able to display information outputted from a vault 108 in the multi-lender layer 105, to the customer, dealer, or digital retailer, through the interface application being used, in a lender agnostic format. That is, information gathered in a lender-specific manner from multiple lenders in the Multi-Lender Layer 105 may be combined in a single payload and outputted to the Experience Layer 104, from where it is displayed in any of user-facing interface applications 101-103, in a universal, consumer-friendly format.

The Multi-Lender Layer 105, from which lender-specific information is relayed to and from the Experience Layer 104, and onwards to the end-user, through the aforementioned interfaces, may include an API Passthru 107, and a Vault 108. In the Multi-Lender Layer 105, the Vault 108 includes various lender-specific micro-processes contained in a lender specific broker 114, such as Prequalification 108a, Product Eligibility 108b, and Pricing 108c. When a prequalification request, pricing request, or product eligibility request, etc., is submitted for multiple lenders from the experience layer 104, these requests go through the API passthru 107 to a lender router 116, which routes these requests to a lender specific broker 114. Each separate lender has its own lender specific broker 114, and the lender router 116 routes each respective request to the correct broker 114 for a particular lender.

Once routed to the correct lender specific broker 114, a request may assess two types of eligibility for a specific lender when determining if an applicant may be able to obtain a loan for a desired product, such as a vehicle. The first lender-specific eligibility request is applicant eligibility, which is assessed by the lender Prequalification microservice 108a. The second type of lender-specific eligibility request determines product eligibility, assessed by a separate lender product Eligibility micro-service 108b.

Every lender may give their own requirements with respect to applicant prequalification as well as for which products may be eligible for lending, as lender-specific information where said information is stored in rules in the Lender Confidential information repository 108f. The multi-lender architecture is able to take these individual lender requirements, which each lender inputs through an individual lender portal 109, through the Lender Confidential data service 108e. Through this self-contained service in the vault, inaccessible to the administrators of the multi-lender architecture, the multi-lender architecture autonomously takes individual processing rules and logic inputted through the lender portal, and standardizes these lender-specific processing rules into rules which may be parsed by the lender specific micro-processes 108a-108c, and houses them in a Lender Confidential Repository 108f, in vault 108.

The vault 108 may also include an Encrypted Logs Data Repository 108d, which can track results from the different microservices inside of the Vault 108 for a particular lender. In the structure of the vault 108, the analytic aggregator 108g may run as a background service which collects and parses encrypted logs and generates business metrics autonomously for every component running inside the vault (e.g. microservices 108a-108c, etc.). The collected logs and generated metrics give the ability to create dashboards for the administrator of the multi-lender architecture. For example, the generated metrics can indicate the health of the vault 108 and its functioning (e.g. troubleshooting for bandwidth problems, connection problems, host problems, infrastructure problems, as well as individual microservice bottlenecking or capacity problems, etc.) without revealing any sensitive information for individual lenders. The encrypted logs are segregated by lender, wherein a particular lender may be able to access the results of their particular logs through an individual lender-specific key in the secure log exchange 110, which may be a server utilizing modes of authentication such as FTP, FTP/SSL, SFTP, FTPS, or the like. In this manner, although microservice and individual component metrics are tabulated in a non-lender specific manner, individual lender-specific information, including potentially sensitive information, trade secrets, etc., can still be kept secure through the use of the lender-specific keys.

Metrics assessed from the Encrypted Logs Data Repository 108d, by the analytic aggregator 108g can include host and infrastructure metrics, as well as microservice metrics for every component in the vault. Host and infrastructure metrics may include assessing overall volume of data on a server, volume requests for individual lender-specific brokers on a particular server, etc. Microservice metrics for assessing a microservice may include, e.g., volume of applications being processed in a predetermined period of time, CPU utilization by the microservice, RAM utilized by the microservice, service availability, the microservice's number of database connections to any databases it uses, latency, errors and exceptions (both handled and unhandled), and the health and status of dependencies, etc.

The Encrypted Logs Data Repository 108d associated with the vault may comprise the details of the lender-specific rules that were executed by microservices, what data looked like as it went through these microservices in the vault, etc., to demonstrate to an independent auditor that the data is not being changed or altered in any way as it traverses through the different components of the layers of the multi-lender architecture.

Lender-specific information submitted via the lender portal 109 by the lender 120, to the lender confidential data service 108e, may comprise any rules or information that the lender may consider (e.g. via prequalification micro-service 108a) to assess the eligibility of prequalification for an applicant for lending, as well as to assess product eligibility (e.g., via product eligibility microservice 108b) for a product for which a prospective applicant seeks financing. For example, for the purchase of a vehicle, in assessing product eligibility via the microservice 108b, such information may comprise attributes such as the make, model, trim, mileage, exterior and interior condition, accident history, etc. of a vehicle. The lender may combine these attributes in any manner, so as to choose only to lend to prospective applicants for financing vehicles which meet a certain condition. These conditions may comprise a combination of attributes, such as a mileage below a certain threshold for a particular make, or a customer only looking for a luxury vehicle, if for example, the lender is targeting high-value purchasers.

In a similar manner, for the same example of purchasing a vehicle, in assessing applicant eligibility at Prequal microservice 108a, lender-specific information submitted via the lender portal 109 by the lender 120, to the Lender Confidential data service 108e, pertaining to attributes for applicant eligibility may comprise, e.g., salary, geographic location, credit score, driving violation history, accident history, financial asset disclosure (e.g. existing bank accounts), the amount sought for financing of the desired product, etc. In a similar manner to the attributes for product eligibility for each lender, the lender may combine the attributes for applicant eligibility as well in any manner, so as to choose only to lend to prospective applicants which meet a certain criteria, such as having a credit score above a certain threshold level, being in a certain geographic region, etc. For example, some credit unions participating as lenders may have unique criteria used to determine eligibility requirements for loan applicants.

For assessing both applicant and vehicle eligibility, in combining attributes, Boolean logic such as AND, OR, XOR, etc. may be used to form conditions. In addition, machine learning logic including support vector machines (SVM), random-forest techniques, decision-trees, multi-layer neural networks with backpropagation, K-nearest-neighbors, etc., may be used for classification of the applicant, vehicle, or both in certain groups. As the applicant pool and vehicle pool grows, the applicant and vehicle data sets, or any subsets therein, may be used to train machine-learning classifiers. The classifiers may then be used to classify the data into groups of applicants or groups of vehicles by the prequal 108a and the product eligibility 108b microservices. These groupings may then be used for determining applicant and/or product eligibility, and can further be used in the Pricing microservice 108c. To conserve computing resources, the machine learning logic may be executed from and stored within physical memory present in computing resources 1022, comprising said memory and at least a processor coupled to said memory. In particular, the machine learning logic may be present as an application 1023-1 within a computer resource 1022 executed from memory. A plurality of such computer resources 1022 may form a backend platform 1015 as part of a cloud computing environment 1020, which may be accessed by a network gateway by the GUI 1006 of the Buyer UI 101. Resampling procedures including K-fold cross-validation may be used as well for higher accuracy in training datasets, and for initial training when datasets are small.

Figure 11:
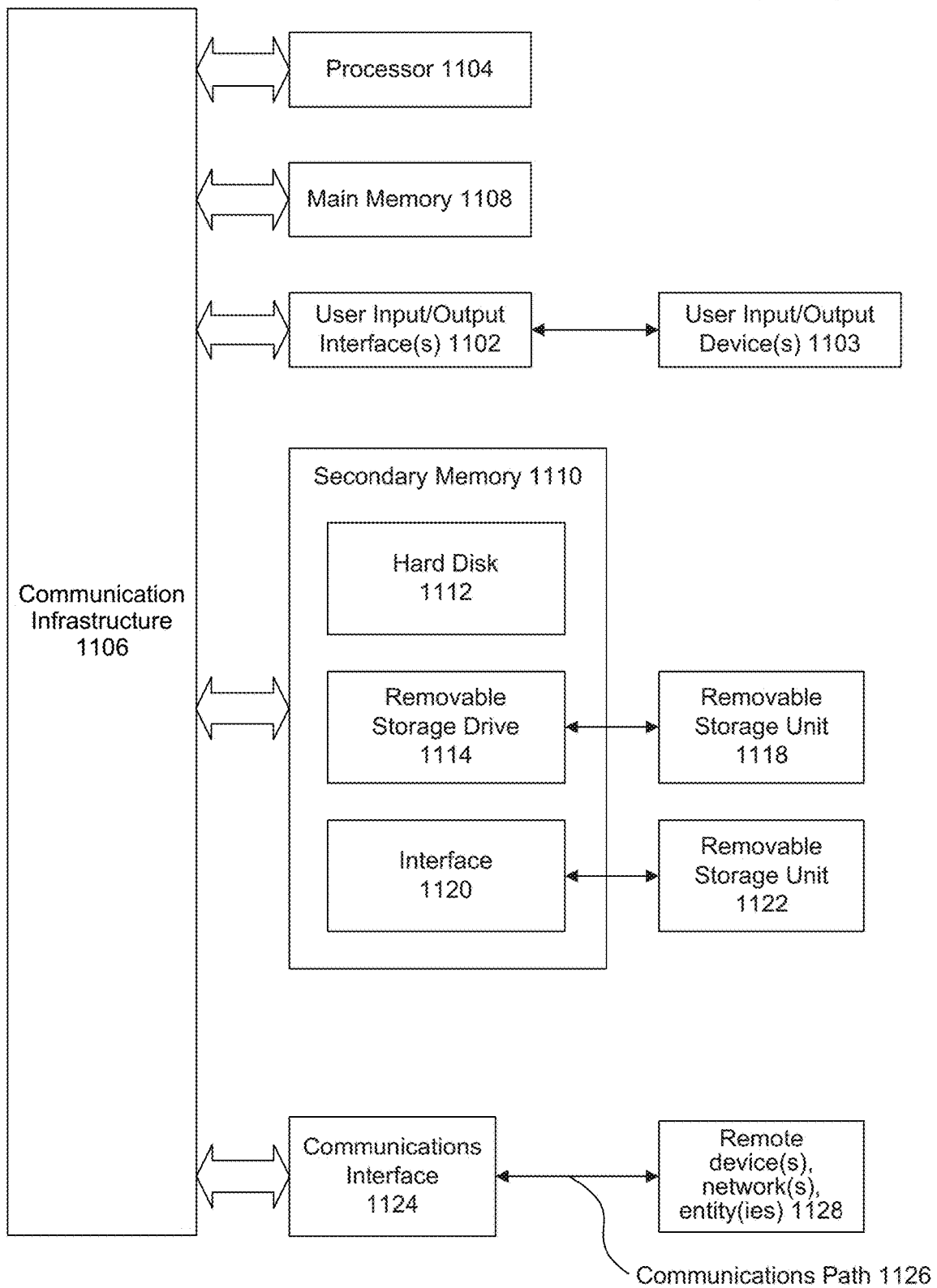
FIG. 11 is a block diagram of an example computer system.

Eligibility decisions for the Product Eligibility microservice 108b and the applicant Prequal microservice 108a, as well as for pre-lender eligibility screening (which will be described infra) may be based on such types of logic. This includes the aforementioned Boolean logic or machine-learning logic, which the lender is able to input into the Lender Portal 109 in the form of rule sets, in addition to the type of criteria being assessed. Such a portal 109 may be a secure web interface on a hosted server utilizing HTTPS, SFTP, WebDav, or a third party cloud service (e.g. Amazon AWS, Microsoft Azure, etc.), which may take user input through files, form fields, etc. In an embodiment, the lender 120, as shown in FIG. 1, is able to input information into the lender portal 109 in the form of rule sets and executable instructions which may be lender-specific and non-standardized. Then, the self-contained Lender Confidential data service 108e may run on these rule sets and executable instructions, to convert them autonomously to standaradized instructions which can be parsed by the microservices 108a-108c of the lender-specific broker 114. These instructions may be encrypted with a lender-specific key, where there is further a different lender-specific key for each lender specific microprocess, and stored in the Lender Confidential data repository 108f. The repository 108f may be a data structure such as a database stored on a non-transitory computer readable-media, or any combination of primary memory 1108 and secondary memory 1110, as shown in FIG. 11.

This lender information may be in the form of simple commands which are translated into standardized parse-able instructions in the form of machine-level code by the Lender Confidential data service 108e, which may e.g. be an interface application within the lender portal 109. To aid the lender in inputting rule sets and executable instructions, the web interface of the portal 109 may include having the lender choose the type of eligibility criteria to be assessed from drop-down lists and combining them with Boolean operators. On the other hand, the lender may be able to write their own shell code, and or scripts, in languages such as the Python scripting language, JAVA, SQL, C, MATLAB etc., and submit this written code in an instruction file, which may be able to operate using machine learning and/or Boolean logic as described above on the user information securely. This code is then converted, in an autonomous manner, by the Lender Confidential data service 108e within the vault 108, and encrypted, to standardized parse-able instructions by the microservices 108a-108c of the lender specific brokers 114, where said instructions are written to the Lender Confidential data repository 108f.

Additionally, the lender may be able to give feedback to a marketplace client 207 through the lender portal 109 on whether applicant leads generated by the pre-eligibility screening criteria (described infra) are suitable leads or not. In such a circumstance, the aforementioned machine-learning logic that is incorporated into the parse-able rules and present in the Lender Confidential data repository 108f may be able to learn from such feedback over time, by classifying the data against a number of features according to classifier weights, and adjusting the weights based on the received feedback. One example of training is the SVM, where features having the smallest weights are removed and the algorithm is re-trained with the remaining weights, wherein said process is repeated until features remain that are able to accurately separate the data into different patterns or classes. The removing of the features and re-training of the algorithm is conducted by the Lender Confidential data service 108e, taking into account the lender feedback from the lender portal 109 (the lender deeming whether a certain given lead is suitable or not for lending to), and rewriting the parse-able rules in the Lender Confidential data repository 108f, accordingly. In this manner, a multi-dimensional separating hyperplane may be constructed.

Alternately, a neural network type algorithm may be used, such as a neural network with back-propagation, where there may be a weight matrix for each layer of the neural network, wherein for each layer a bias vector is defined. The weights are then multiplied by the input signals, and applying activation functions, the output may be calculated. Backpropagation aids in computing the error of partial derivatives, which error can then be minimized across layers. Such backpropagation can form the central mechanism by which the neural network learns. Again, in this example, the Lender Confidential data service 108e may take into account the lender feedback from the lender portal 109 in the backpropagation (whether a lead is deemed suitable or not) to compute error, and may use this feedback to adjust the weight matrix, etc., and rewrite the parse-able rules in the Lender Confidential data repository 108f. This may aid in discovering trends for classification wherein resources of a particular system may be more likely to be used.

In addition, attributes of the applicant Prequal microservice 108a may be combined with attributes of the product from Product Eligibility microservice 108b to create composite condition requirements. An example of such a composite requirement may be where for a product purchase of a vehicle, a certain lender may only lend to an applicant with a credit score above a certain threshold, only for a particular make or makes of vehicles, at a certain mileage threshold, etc. For example, a lender targeting luxury vehicles may only consider lending to high net worth individuals with a threshold credit score, etc. Any permutation or combination of attributes between the two steps is possible to create composite eligibility conditions, which may account for agreements certain lenders may have with certain sellers of products, and vice versa.

In FIG. 1, after the applicant eligibility may be assessed by the prequal 108a microservice, and the product eligibility may be assessed by the product eligibility 108b microservice, the further lender-specific rules and executable logic comprised in the Lender Confidential data repository 108f may be used by the Pricing microservice 108c, to determine potential terms of financing for the product by a particular user/buyer. Using both the applicant prequal 108a results and the product eligibility 108b results, the pricing 108c microservice may use lender-specific information such as pricing grids, matrix-based manipulation, lender-specific mathematical formulas, etc., to combine the applicant based attributes and the product based attributes. After combining these attributes, the pricing 108c microservice can determine financing terms such as fixed or variable APR's, maximum amount that an applicant may borrow, length of financing, required minimum monthly payment, prepayment penalties, required balloon payments, among other terms. These terms may then be sent as encrypted output from the Vault 108, as will be described infra through the API Passthru 107, and to the Buy/Sell API 106.

Figure 2:
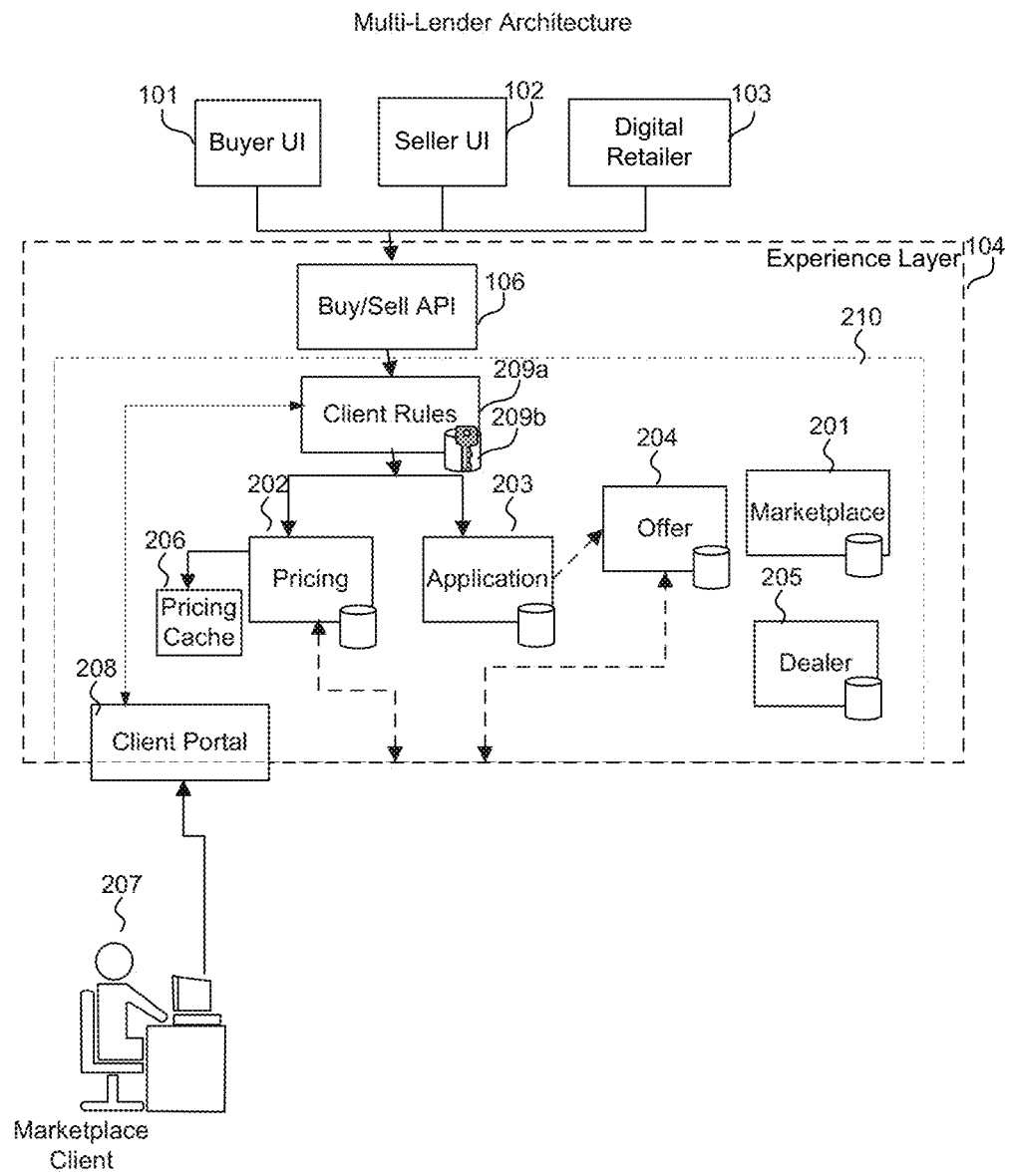
FIG. 2 is a block diagram showing an expanded view and example of the Experience Layer and the working flow of the Buy/Sell API within said layer according to an embodiment.
Figure 10:
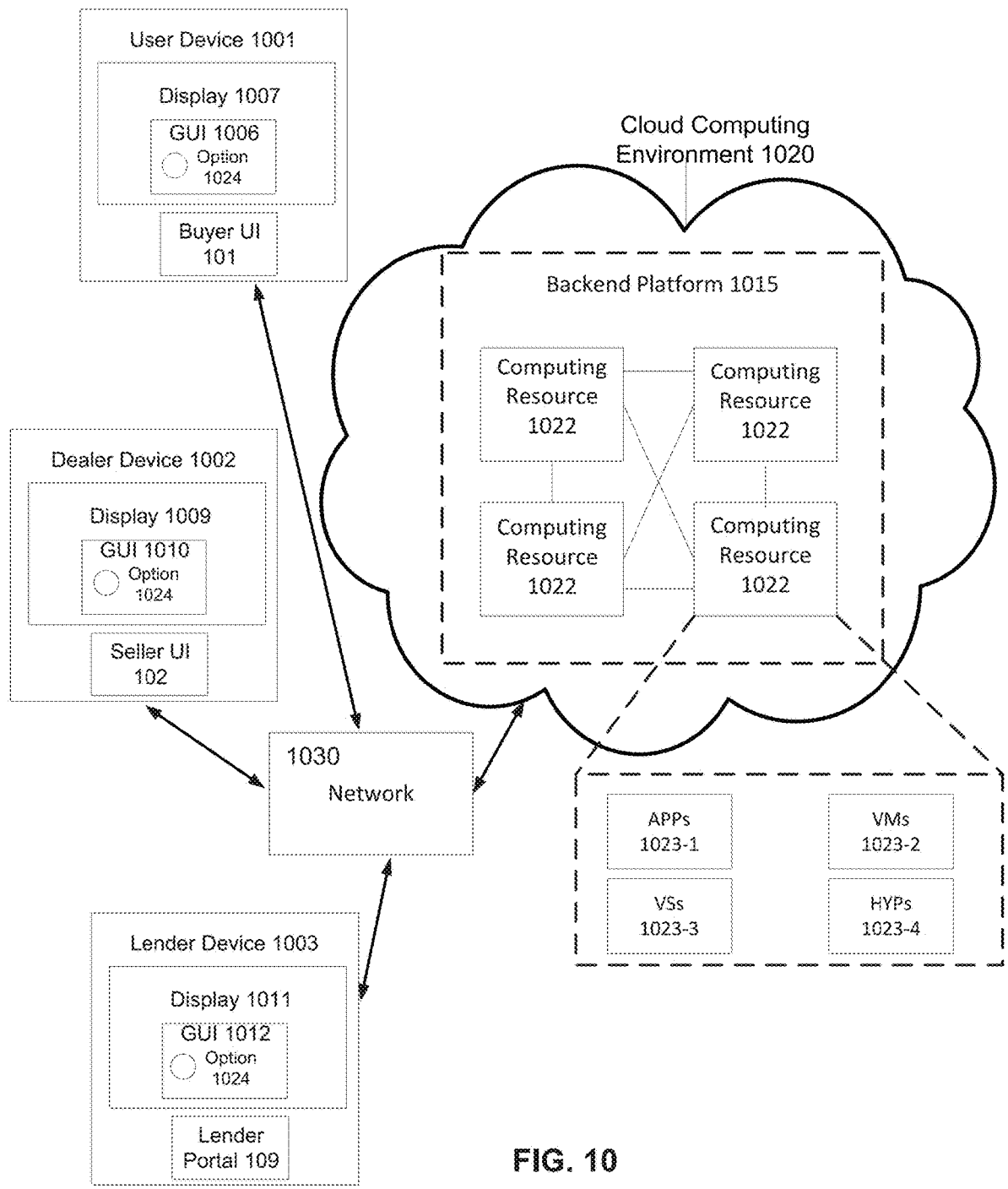
FIG. 10 is a block diagram of an example network environment.

The Buy/Sell API 106 is also present as shown in Multi-Lender Architecture 200 of FIG. 2, which shows the Experience Layer 104 of FIG. 1 in greater detail. In FIG. 2, the offer repository 204 is tied to a particular application in the application repository 203, where both repositories 203 and 204 are segregated by user session for different users. For example, for a particular application that a user is working on, which may be stored in application repository 203, when pricing conditions are determined by the Pricing microservice 108c within the vault, these pricing conditions may be output to pricing repository 202 in the Experience Layer 104. In this manner, lender-specific information associated with a particular application that a user may be working on (stored in application repository 203) may be output from the Multi-Lender Layer 105 to the offer repository 204, application repository 203, or pricing repository 202 in the Experience Layer 104. Upon receiving such lender-specific information (e.g., the pricing conditions above) in the Experience Layer 104, the Buy/Sell API 106 may transform such lender-specific information (e.g., through decryption) from the offer repository 204, application repository 203, or pricing repository 202 as lender-agnostic output. This lender-agnostic output is used to display results from various lenders inside of a user-session in a GUI 1009 of the Buyer UI 101, as shown in FIG. 10. For example, the Buy/Sell API 106 may use the terms output by the Pricing microservice 108c for a specific lender as present in the pricing repository 202 for a particular user application (stored in application repository 203). This can be used to display results to populate the fields of an offer from a lender in the offer repository 206 corresponding to the same application, inside of a GUI 1006 of the Buyer UI 101, as shown in FIG. 10. In this manner, a user may see the terms of a potential loan by a lender for a specific product. This can be done for multiple lenders collectively, wherein in an embodiment the vault may send lender-specific information as encrypted output in a lender-agnostic form from multiple lenders processed in parallel in the vault, in one payload to the experience layer 104. In this case, the buy/sell API 106 decrypts the lender-agnostic output for a plurality of lenders at once from the Pricing repository 202 for a particular user application. The decrypted output may then be used to populate the fields of an offer from the offer repository 206 corresponding to the same application, to display it in a universal, user-friendly, and aesthetically uniform format to the user.

Figure 9:
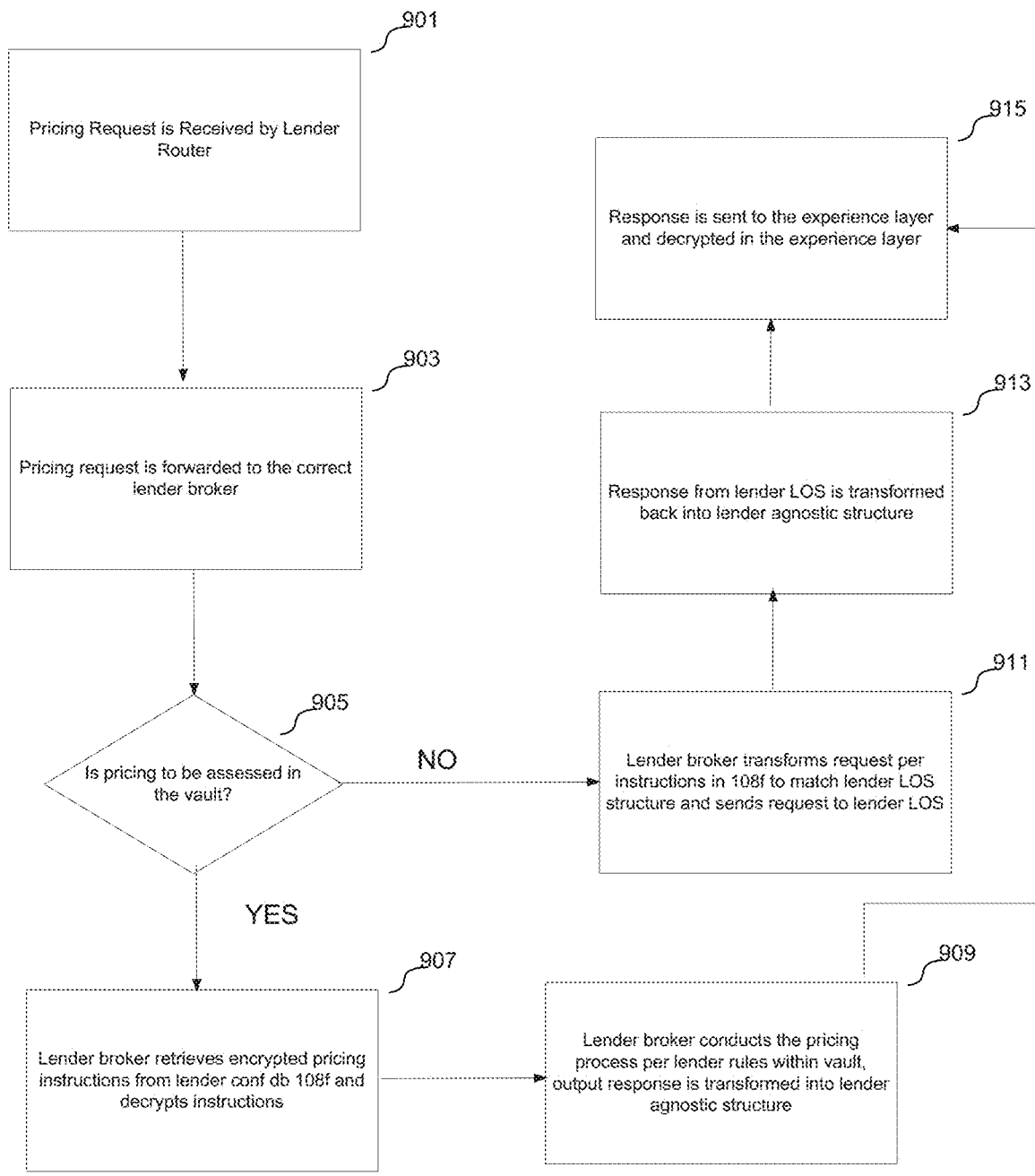
FIG. 9 is a flowchart showing the flow of how a pricing request is evaluated.

Through the Lender Portal 109, which as described may in an embodiment be a cloud-based portal, the lenders may access the Multi-Lender Layer 105. As shown in FIG. 1, the Multi-Lender Layer 105, through Lender Confidential data service 108e, is able to relay pricing rules and executable logic from the lender 120 to the Lender Confidential data repository 108f. From here, the lender specific broker 114 for a particular lender can use these rules and logic to conduct its pricing process within the vault or in a third party loan origination system (LOS) in an alternate embodiment. Such an embodiment will be explained later with reference to FIG. 9. Regardless of which embodiment conducts the pricing process, the resulting response with pricing terms, in steps 911, or 915 of FIG. 9, is transformed into a lender-agnostic structure by using the encryption service 115. Through this encryption service 115, the lender-specific output is encrypted in a secure, universal format, that is the same for all lender-specific output from various lenders 120.

Figure 6:
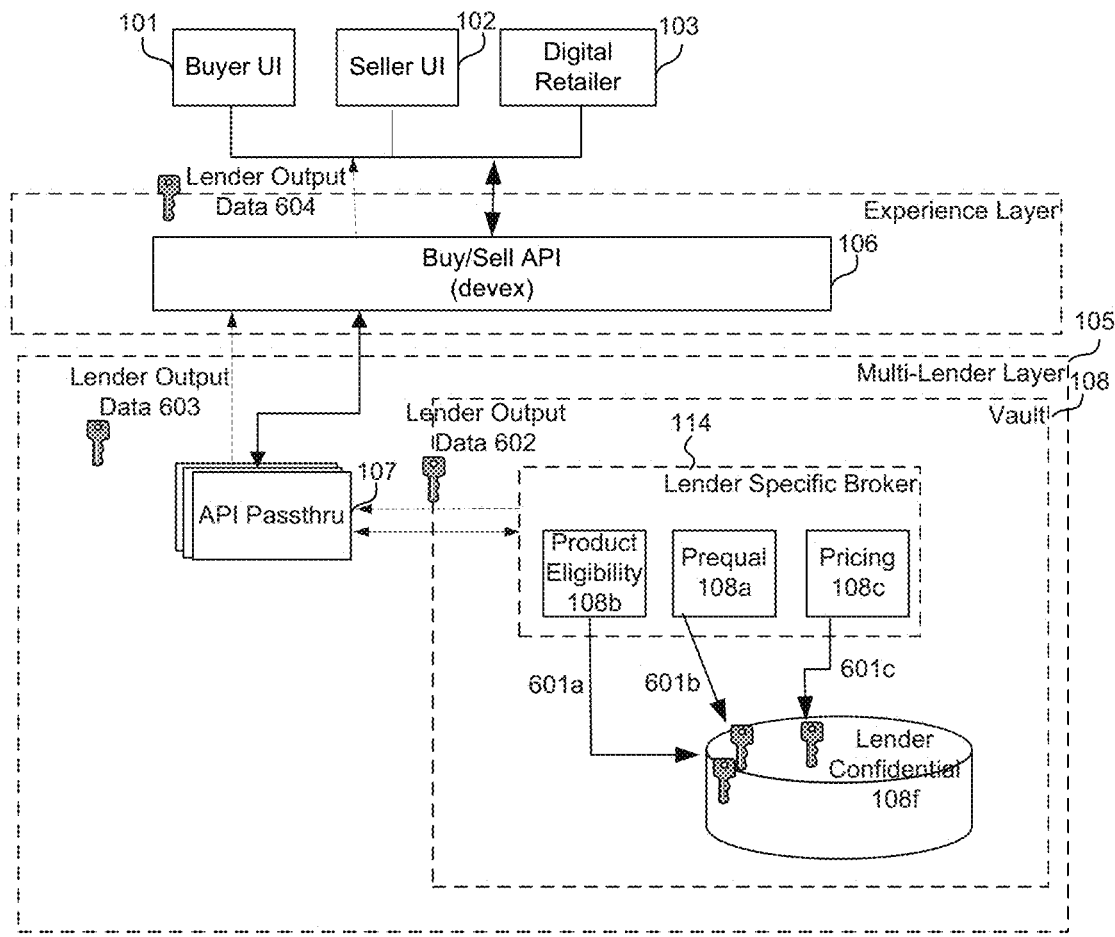
FIG. 6 is a block diagram showing the flow of lender-agnostic data from the vault to the experience layer and ultimately the user experience layer.

FIG. 6 shows the flow of the lender-specific output through the multi-lender architecture in a lender agnostic format. As shown by dashed arrow 602, this lender-specific output is relayed, encrypted in a lender agnostic format, from the lender specific broker 114 (can be through the lender router 116 in FIG. 1 or directly from the lender specific broker 114 as shown in FIG. 6) to the API Passthru 107 in a lender-agnostic format. From here, the data of lender-specific output for one or more lenders is relayed to the Experience Layer 104 as shown by dashed arrow 603. From here, as explained above with reference to FIG. 2, the Buy/Sell API 106 within the experience layer decrypts the lender-agnostic data, from where it is displayed in a particular user session of the user-facing interface applications 101-103. This decryption and displaying in the user session is shown by the dashed arrow 604 in FIG. 6. As a result of this information flow, although each lender's specific output is segregated in the vault, it can be compiled into a universally encrypted lender agnostic composite payload, where information for each lender is displayed in a universal format with regard to loan and pricing terms to the user in e.g. a user session of the Buyer UI 101. Further, no external tools can access the memory in said user session, and thus the information is delivered in an end-to-end encrypted manner from the vault 108 to the user-facing application Buyer UI 101.

Information is stored in vault 108 in a secure and encrypted manner, wherein the vault is a jailed, secured, self-contained network within the multi-lender architecture, configured to receive and transmit data in an encrypted format. In an embodiment, the vault 108 may prevent access to physical hardware, and may be located on a remote hosted server as a cloud network, as shown in FIG. 10 and will be explained later. In this self-contained network, lenders manage their own separate accounts, and no one except for the lender, including even the administrator of the multi-lender architecture (e.g. a marketplace client, or the administrator of several marketplace clients), is able to view lender confidential information inside Lender Confidential data repository 108f. Lenders may only view their own data inside the Vault 108, through specific provisioned keys (e.g. 601a-601c described above) accessible through the lender portal 109 which operates as described above. Consequently, lenders may not view data associated with other lenders. This is possible by having separate encryption keys for each specific lender. A similar methodology may be employed with respect to multiple marketplace clients as well, as will be explained.

These separate keys are shown in FIG. 6. For greater security there are two layers for individual keys. The first layer is segregated by specific lender. Below this layer, in a second layer, rules and executable logic pertaining to each separate microservice/microprocess for a particular lender (e.g. prequalification, product eligibility, and pricing) may be provisioned with their own encryption key for each respective microservice. For example, in FIG. 6, a first layer key is shown at the flow of lender output data 602 from the lender specific broker 114 of a particular lender to the API Passthru 107. Additionally, three separate second layer keys 601a, 601b, and 601c are shown, as used by microprocesses 108b, 108a, and 108c respectively for the particular lender. These three second layer keys are used to access standardized parse-able lender specific rules and executable logic in the Lender Confidential data repository 108f for a particular lender and for a specific process of that lender (e.g. pre-qualification, product eligibility, or pricing). In this manner, each lender specific process in the vault has access to only one of these keys with specific privileges, ensuring access to data is segregated to the maximal extent possible, enhancing security, and limiting access to trusted components. Further, because the Lender Confidential data service 108e parses the individual lender rules for these processes in a standard format interpretable by the microprocesses 108a-108c, these microprocesses, for each specific lender broker, may be autonomous processes running inside the vault itself.

The data and coding scripts run by individual lenders, inside the vault 108 may not be visible to users through the Buyer UI 101, Seller UI 102, or Digital Retailer 103 interface applications. Through inputting lender confidential information 108e which may include user information as well as Boolean and/or machine learning logic to apply to said user information from the individual lender portal 109, each lender is able to securely manage its eligibility criteria, rules, filing policies, and/or the like.

In an embodiment, lenders may use the interface of the Lender Portal 109 to upload and/or communicate information associated with their lender-specific requirements and eligibility rules, which is then interpreted in a standard parse-able format for microservices 108a-108c by the Lender Confidential data service 108e, and wherein the standard parse-able translated rules and executable logic are written to the Lender Confidential data repository 108f. The requirements and rules may include rules, algorithms, equations, restrictions, scripts (as described above) and/or the like, which govern the process of offering users loans for automobiles (or other goods) at determined prices. The requirements and rules for each individual lender is lender-specific, and therefore must be confidential and can be safely stored in the vault. The information stored in the Lender Confidential Information repository 108f may then be run through self-contained software within the vault. In an embodiment, the information received and stored may be decrypted by the trusted autonomous microprocesses 108a-108c of a specific lender broker 114 for applying said rules/logic to user information, wherein the output is encrypted by the encryption service 115 and is stored in an encrypted format.

A user may interface with Buyer UI 101, Seller UI 102, or Digital Retailer 103, in an attempt to obtain pricing information for a loan for a goods purchase, such as a loan for an automobile. In one embodiment, the Buyer UI 101, Seller UI 102, or Digital Retailer 103 application may each render different graphical user interfaces (GUIs) 1006, 1010, and 1012, respectively, as shown in FIG. 10. Each such GUI is configured to receive input from the user which may be transmitted to the multi-lender layer 105 for further processing, for example to obtain pricing information for a loan for an automobile. The input information may be transmitted to the multi-lender layer 105 through the Buy/Sell API 106.

Figure 3:
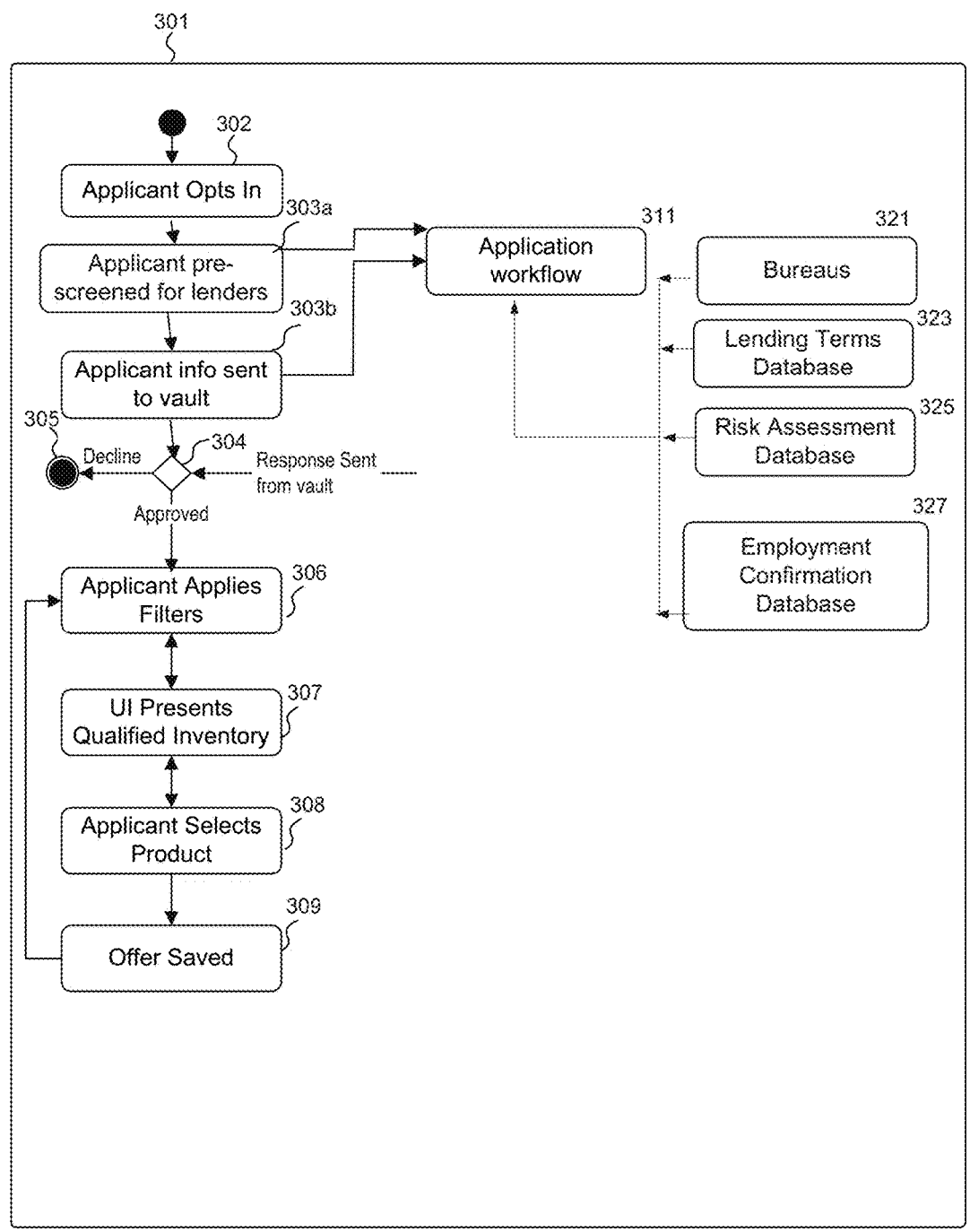
FIG. 3 is a flowchart showing an example flow through the multi-lender platform architecture for one lender.

The API interaction of the Buy/Sell API 106, API Passthru 107, and Vault 108 in assessing applicant and vehicle eligibility, as well as general use of the vault, will herein be described in more detail. As shown in FIG. 2, there may be a Buy/Sell Marketplace associated with marketplace client 207, which is designated as Marketplace 301 in FIG. 3, present in the Experience Layer 104. The Marketplace 201, through the Buy/Sell API 106, may be rendered in the GUI 1006 of the Buyer UI 101 user interface. In this Marketplace 201, an inventory of available products, such as vehicles (in the example of a vehicle purchase), or other products, may be displayed to the user in a dynamic and continuously updated manner. The flow of the Buyer UI 101 interface with respect to a single lender for a single marketplace client 207 may be shown in FIG. 3.

With respect to a single lender as shown in FIG. 3, the user in the user-facing application 101, through the GUI 1006, may disclose their financial credentials and apply for lender prequalification under the rules of a marketplace client 207 by opting in at step 302, Applicant Opts In. At this point, at step 303a the applicant is pre-screened for which lenders would be suitable for the applicant based on rules of the marketplace client 207, and based on which lenders are found suitable for the potential buyer's financing application to be submitted to, an application workflow is created at step 311. An entry is made for a new application in the application repository 203 of FIG. 2 described above. As will be explained infra, in an embodiment analogous microservices for any combination of 108a-108c may be performed under a 3$^{rd}$ party API 111a instead of vault 108, and may be used to assess lender prequalification, product eligibility, and/or pricing. In this case, applicant information may be still first sent to the vault 108, from where it is routed to the third party API, as will be explained with respect to FIGS. 7-9. For example, the information may be routed to a third-party based system, such as a website, used for performing microservices 108a-108c, and the outputs from said microservices may be aggregated by the lender specific broker 114 within the vault 108.

Since the marketplace client 207 administers the marketplace 201 connecting potential buyers and sellers, the marketplace client 207 can have their own rules entered into the client rules database 209b, for sending applicant financing applications to lenders which are found suitable. Once the application workflow is created, an entry is made for a new application in the application repository 203 of FIG. 2 described above. In an embodiment, before the user discloses their financial credentials and applies for lender prequalification, a full inventory of products, such as vehicles, may be displayed in the GUI 1006, depending e.g., on the user's geographic location, wherein the microservices 108a-108c can then take into account the user's selection of vehicle when assessing eligibility/pricing at step 303a onwards. In an alternate embodiment, no products, such as vehicles, may be displayed unless the user successfully applies for lender prequalification under the Applicant Opts In step 302. In yet another embodiment, no products may be displayed unless the user successfully applies for lender prequalification and is found to be pre-screened for several lenders in step 303a. In this embodiment, only products that the several lenders are willing to finance, per the rules for product eligibility for the several lenders stored in the lender confidential database 108f, are displayed in the GUI 1006.

In any of the above embodiments, once products are displayed in GUI 1006, and the user is pre-screened for several lenders in step 303a, a full list of the several lenders, which are user-associated prospective lenders, may be displayed (e.g. represented by iconds, logos, trade names, etc.) along with the products (unless the user has already selected one). For example, only those pre-screened lenders for which the user is likely to prequalify for lending based on the user's credentials and/or a particular vehicle may be shown (and may be selectable) to enable the user to complete a prequalification process with respect to the prospective lenders. This list may be dynamically adjusted throughout the process (e.g. to add or remove eligible prospective lenders) as the user inputs his/her financial credentials, etc., and this information is processed first by the lender pre-screening in step 303a, and then for those lenders which the user is found eligible, as the user information is processed by the microservices (e.g. 108a-108c) for lender specific brokers 114 in the Multi-Lender Layer 105 in step 303b. The user Applicant may also apply his or her own filters with product attributes, such as, for vehicles, Make, Mileage, Color, Trim, Geographic Location, etc., to narrow down the list of products under the Applicant Applies Filters 306 step. Finally, a narrowed-down list of dynamically displayed products for which the Applicant is eligible after relevant microservices have run (e.g. prequal 108a and product eligibility 108b microservices for a lender-specific broker 114), and the applicant has applied filters, is presented under the UI Presents Qualified Inventory 307 step. Out of this qualified inventory, the Applicant may select a desired product for purchase for which he/she is prequalified and eligible to purchase from a specific lender, at Applicant Selects Product step 308. Finally, the pricing 108c microservice for a lender-specific broker 114 is run based on the selected desired product by the applicant from step 308, and pricing terms are fed back from the multi-lender layer 105 to the experience layer 104, and stored in the Offer repository 204 at step Offer Saved 309.

The user can, as described above, enter their applicant information into entry fields in the GUI 1006 of the Buyer UI 101. In an embodiment, before said information is relayed to the Multi-Lender Layer 105 by the Buy/Sell API 106 in step 303b, relative to a particular user, the user's information is first checked against lender pre-screening criteria in step 303a to identify those lenders for which the user is likely to prequalify for lending. This criteria acts as a decision funnel, in order to filter which lenders the user's application should be sent to or which lenders should be displayed for a user to select for a prequalification decision. For example, in an embodiment, if the administrator of the Multi-Lender Architecture, which may be the market place client 207 or other separate administrator, is themselves a lender, they may only send user's application to other lenders when they themselves do not find the user suitable to lend to. In another embodiment, the system of the Multi-Lender Architecture 100 may present multiple options to a user, and may send the user's application to other lenders even if the system finds that, based on a lender-administrator's decision-making policies, the lender-administrator is able to lend to the user.

In the latter embodiment, the user may first be searching through an inventory of products in the Marketplace 201, as displayed in GUI 1006 of the Buyer UI 101 user interface, without electing any specific lender. Then, after the customer has chosen a vehicle of his or her desired choice, they may enter their personal and financial information, such as salary, geographic location, credit score, driving violation history, accident history, financial asset disclosure (e.g. existing bank accounts), the amount sought for financing of the desired product, etc. Alternately, the user may enter their information first, and then search through the inventory of products, without electing any specific lender. In another embodiment, the user may only enter their information first, and not be able to choose any product out of the inventory of products until microservices 801a and 801b have run after a lender pre-screening criteria is initially run. In this embodiment, the full list of eligible lenders that the buyer is eligible for is pre-decided, then they may choose products at step 306. The lender pre-screening criteria may be assessed by the Buy/Sell API 106 within the Experience Layer 104, before information is relayed to Multi-Lender Layer 105.

Figure 7:
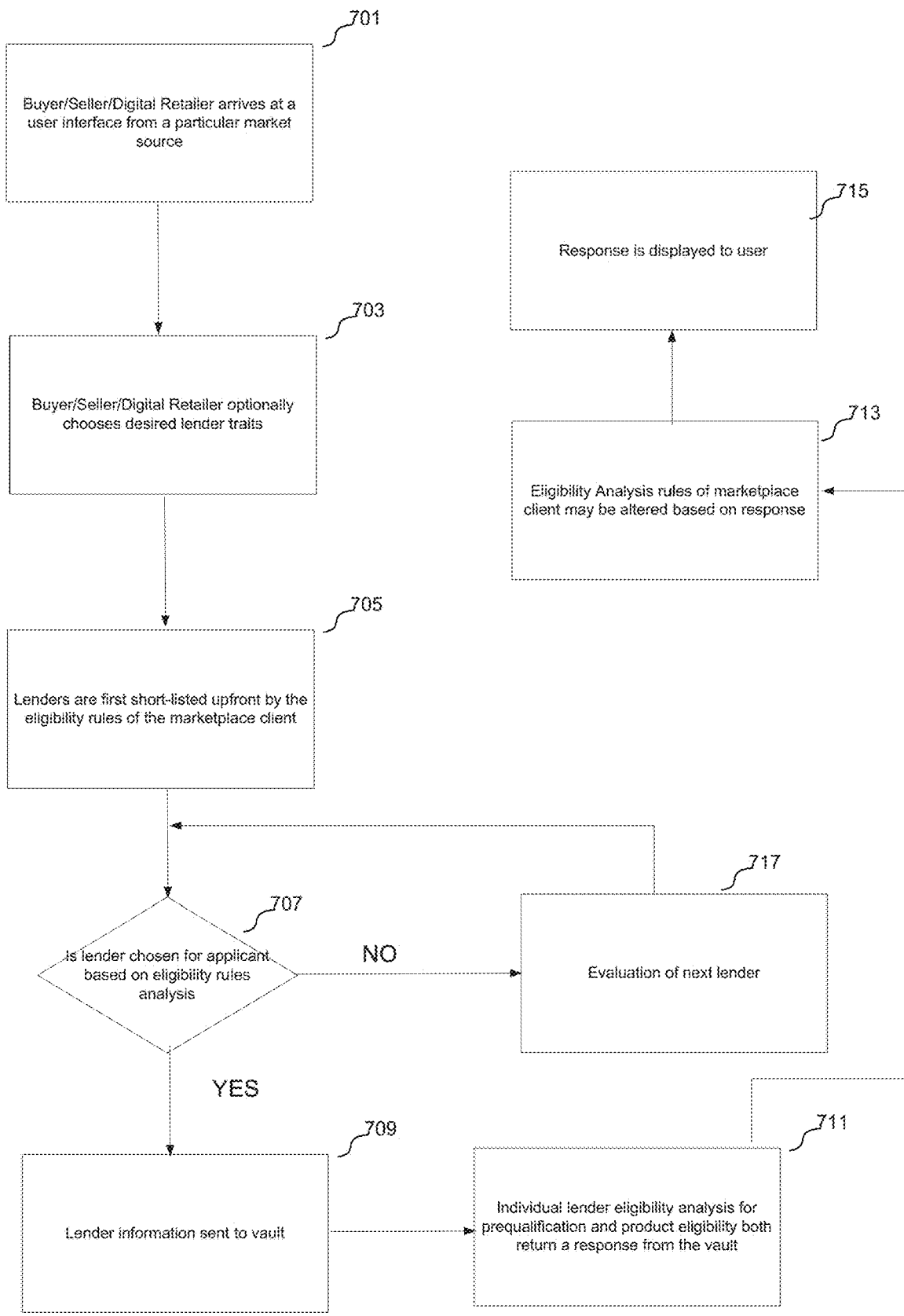
FIG. 7 is a flowchart showing the flow of how marketplace client eligibility rules are used as a first part of eligibility evaluation for sending user information to particular lenders.

The lender pre-screening criteria assessment by the Buy/Sell API 106 in step 303a is described in greater detail with respect to FIGS. 4-7, wherein FIG. 7 describes the overall process. In the overall process, at step 701, the prospective buyer/purchaser may first arrive at the GUI 1006 of the Buyer UI 101 user interface from a market source (e.g. a website), where they may have been re-directed to the Buyer UI 101 user interface. Market sources may be lender-based websites, product-based websites, or the like, wherein a market place client 207 may have pre-existing agreements with owners of market sources, wherein only certain products/lenders may be serviced for traffic that is re-direct from a particular market source. That is, at step 701 a market source based filter may first be applied to all prospective lenders 120 that are present within the vault. The lender pre-screening criteria takes into account where the traffic that is using the Buyer UI 101 user interface has originated from (e.g., if the buyer UI 101 user interface is of a web application running on a webpage, the application can track sources of where users using said application have come from, such as other websites of the market sources described above). For example, if a lender 120 is a market source which re-directs traffic to the Buyer UI 101 user interface of a marketplace client 207, such a lender 120 may do so on the pre-condition that the marketplace client 207 will not pre-screen the applicant for competitor lenders. Thus, depending on the market source, and any pre-existing agreements that may exist between such market sources, such as websites of lenders 120 and marketplace clients 207, when traffic is re-directed from said sources to the Buyer UI 101 user interface, it may only be screened for certain lenders 120 in the vault 108. Such agreements may vary market source to market source, and any combination of lenders 120 may be screened out based on the market source. In another embodiment, such a market-source-based filter may not be applied at step 701, and regardless of market source, the prospective applicant/buyer is screened against all lenders 120 in the subsequent steps. The above description of 701 also equally applies to a prospective Seller or Digital Retailer in an analogous manner.

Subsequently, at step 703 of the lender pre-screening process shown in FIG. 7, after the Buyer arrives at the Buyer UI 101 user interface, he may interact with the GUI 1006 shown in FIG. 10. Here, the buyer may provide information including their personal and financial information, such as salary, geographic location, credit score, driving violation history, accident history, financial asset disclosure (e.g. existing bank accounts), the amount sought for financing of the desired product, etc. Per the rules of a marketplace client 207 stored in the repository 209*b*, a marketplace client may require a certain number or type of the above buyer input fields to be inputted as a requirement, into GUI 1006, for lender pre-screening to take place. This is because certain marketplace clients 207 per their own assessments (by looking at historical data, etc.) may determine that applications are likely to be rejected by any of the lenders 120 unless a threshold level of information presented by the applicant is present. The Buyer UI Interface 101 can thus require the user of the interface 101 to input such a threshold level of information, wherein such a requirement may be stored as a rule in the client rules repository 209*b*. The rule may be executed, for example, wherein a threshold level of multiple fields for user information are presented as options 1024 (either selections with radio-buttons as shown in FIG. 10 for fields e.g. gender, etc., drop-down boxes for country/state, etc., or selections with text-entry fields for numerical or string input regarding salary, etc.) within GUI 1006. Then, when fields are left uncompleted by the user, the Buyer UI 101 user interface may not let the user proceed further along the application flow, and may display a message in the GUI 1006 requiring input of the incomplete fields before proceeding further. Finally, when a threshold number of fields are entered, then the Buyer UI 101 user interface may proceed along the next step in FIG. 7.

Alternately, in another embodiment, a threshold number of fields may not be required to be entered at step 703, and any number of entered fields may suffice for purposes of assessment, wherein if not enough fields are entered, zero eligible lenders may be returned as a potential result in the next step 705. In step 705, the eligibility rules of a marketplace client 207, stored in the client rules repository 209*b*, are run against the applicant-provided information in step 703, to determine a short-list of lenders upfront, which are deemed to be suitable for lending to the applicant/buyer. During this step of lender pre-screening criteria assessment, the Buy/Sell API 106 compares the user's entered information against a ruleset concerning a subset of this information (rules concerning e.g., credit score, zip code, and age). Such a ruleset may be comprised from Boolean operators and/or machine learning logic operating on the subset of relevant user information, such as, in this example, on score thresholds for credit score, geographic thresholds for zip code, or age thresholds for age. Similarly, thresholds or required values may be required for any of the applicant-provided information described above, as part of the rule set stored in client rules repository 209*b*. Additionally, as described later with respect to the prequalification and product eligibility lender rules for microservices 108*a*-108*b*, a designated score may be generated with respect to the user's entered information based on Boolean operators, and/or mathematical formulas or machine learning logic with respect to the user's entered information. In this case determination of whether a lender is chosen for an applicant based on the eligibility rules analysis, with respect to an individual lender 120, may depend on the applicant's designated score, where different designated scores may be required to be eligible for different lenders 120. Similarly, in other embodiments, the eligibility rules analysis may require a different combination of Boolean operators and/or machine learning logic for different lenders, depending on the lender, for an applicant to be found suitable to apply to that lender for financing. For example, a market place client 207 may know from historical data that a certain lender is stricter on credit score, or another lender is confined to a certain location, or another lender only targets high net worth or low net worth individuals, and can adjust the eligibility rules analysis criteria accordingly for that particular lender. In this manner, different combinations of rules and logic can be stored in repository 209*b* for a market place client 207 with respect to each potential lender 120 in step 705.

The lender pre-screening criteria assessment in step 705 can take place in a plurality of ways. The lender pre-screening criteria assessment may take place in a cascade-like manner, wherein using the example of credit score and zip code, a credit pull may first be made with a third-party service for assessing the user's credit score, in the same manner as will be explained infra in the prequal 108*a* micro-service. In making such a credit pull, the user information in the application workflow 311 may be polled against the external databases of credit bureaus 321, lending terms databases 323, risk assessment databases 325, or employment confirmation databases 327. If the credit score is found to be above a predetermined threshold, the lending terms and risk involved based on the application workflow 311 meet required thresholds, the potential buyer is found to have a steady employment history, etc., then the lender pre-screening criteria assessment may proceed to the next step, which may be zip code in an embodiment. If the user is found to be within a certain zip code or zip codes, or geographical region, then the lender pre-screening criteria assessment may proceed to a further step, wherein other criteria may also be considered. If all of the criteria are satisfied the lender may appear as a selectable option in the GUI 1006 of the Buyer UI 101 for a specific vehicle or vehicles. Otherwise, if at any point in the cascade any condition is not met, the lender pre-screening criteria assessment may be interrupted, the evaluation stopped, and the respective lender option may be omitted, greyed out, or crossed out in the GUI 1006 of the Buyer UI 101.

Then, for lenders for which the user is eligible after being pre-screened with this criteria in step 705, the user is asked if they consent to provide their information to the lenders on the GUI 1006. Based on their response, the user has the option to proceed with getting prequalified under the prequal service 108*a* as explained above, and to proceed further in their loan application process for lenders which the lender pre-screening criteria deems the user is eligible for.

In an embodiment, initially, the GUI 1006 may display an inventory of vehicles in the marketplace 201 to the user, each of which may be financed by several possible lenders. When the user chooses a vehicle within the marketplace 201, a list of possible lenders may appear. In this embodiment, after having chosen the vehicle, the user's personal and financial information may be obtained as described above in the GUI 1006 in step 703, wherein the information may be stored in the Application data repository 203 as displayed in FIG. 2. At this point, the lender pre-screening is run at step 705 as described above based on the user's inputted information and the list of possible lenders for the vehicle. Based on this lender pre-screening criteria, as described with reference to step 303*a* above, the list of possible lenders may have several lenders greyed out, or otherwise displayed as incapable of being applied to (e.g. cross through, redlining, or omitted altogether), based on the narrowing down of lenders that fit the lender pre-screening criteria based on the user information.

In the above embodiments, once the eligibility rules from 209*b* in step 705 have been run, each lender 120 in the vault 108, which has not already been short listed by the market source filter applied in steps 701 and 703, is processed further based on the results of the eligibility analysis. In step 707, for each such lender, if the eligibility analysis in step 705 finds that lender to be deemed suitable for lending to the applicant, the lender 120 may appear as a selectable option in the GUI 1006, and the Buy/Sell API 106 may then relay the user's personal and financial information to the Multi-Lender Layer 105 for further eligibility evaluation. In particular, the inputted user information may be relayed to the corresponding lender specific broker 114 in the vault 108 through the lender router 108. Conversely, if the eligibility analysis in step 705 finds that the lender is not suitable for lending to the applicant, such a lender may be greyed out as displayed in the GUI 1006, and the next lender may be evaluated per step 709.

After step 707, at step 709, information is relayed to lender specific brokers 114 for the lenders found eligible under the eligibility analysis run in step 705 for lending to the applicant. After this is conducted, at step 711, individual lender eligibility analysis for prequalification and product eligibility is conducted by having microservices 108*a* and 108*b* run on the inputted user data, through the lender specific broker 114, as described above. The running of these microservices may return a response (e.g. greying out of the lender if the applicant is found to be ineligible by either micro-service, or returning a YES/NO response on the GUI 1006 for both applicant prequalification eligibility and/or product eligibility, adjacent to the lender 120 name). The running of the microservices 108*a* and 108*b* may occur as a single payload process or a multiple payload process. If run as a multiple payload process, lender information may be sent in payloads to the vault at step 709 after evaluation for every lender 120 to be evaluated in step 707. If run as a single payload process, all lenders may be collectively evaluated in step 707, and for those lenders that are found eligible under the eligibility analysis run in step 705, the user data may be sent in a single payload to the lender specific brokers 114 for these lenders in the vault 108.

Thereafter, the microservices 108*a* and 108*b* may be run in step 711. In the case of the multiple payloads process, processing in the vault 108 may occur in a sequential manner (lender-by-lender). Then the result from microservices 108*a* and 108*b* is sent to the experience layer 104 as described above, where the response is decrypted by the Buy/Sell API 106 for display in the Buyer UI interface 101, serving as a response to the user in step 715. In the case of single payloads process, processing in the vault may occur in parallel (all lenders at once). Then the result from the microservices may be sent jointly for all of the short-listed lenders from step 705, where the response is decrypted by the Buy/Sell API 106 for display in the Buyer UI interface 101.

Based on the response of the microservices 108*a* and 108*b*, the eligibility rules that are run in step 705 may be altered in step 713. That is, the response from the microservices 108*a* and 108*b* is returned to the Buy/Sell API 106, where result of YES/NO, etc., is decrypted for displaying in the Buyer UI interface 101. Here, only the YES/NO response may be stored in the application repository 203, and may be correlated with the user-inputted information in repository 203 to determine if any trends indicate the need for a change in rules for eligibility analysis. For example, if the eligibility analysis for a particular lender 120 is set to a certain threshold for credit score, and a predetermined number of consecutive applicants which are deemed eligible for said lender by step 705, which are just above the threshold score, receive a response of NO for prequalification eligibility from microservice 108*a*, then at step 713, the eligibility rules in 209*b* may be changed to accordingly. In this case, the eligibility rules for the particular lender 120 may be changed to increase the threshold for credit score. In this manner, the number of negative responses for future applicants, with respect to said lender, may be mitigated, and through this type of dynamic evaluation system the eligibility rules analysis for a market place client 207 may continue to short list lenders that are suitable for an applicant to apply to.

In addition to Boolean logic or the cascade-like technique described above, machine learning techniques may also be used at step 705, including SVM's, decision trees, random forest techniques, etc. as described above. These techniques may in fact be paired with non-machine-learning or Boolean type logic. For example, in one embodiment based on historical data, a machine-learning model may be trained initially and used as the eligibility rules in step 705 from the beginning. In another embodiment, logic rules comprising Boolean operators may be used for eligibility analysis without machine learning in step 705. The resulting YES/NO results from microservices 108*a* and 108*b* for a plurality of applicants, as described above, may be stored in the repository 203. These results may over time comprise aggregated metadata based on applicant information and ultimate prequalification or product eligibility result, such that the aggregated metadata may then comprise a training set, which can be used to train a machine learning mode. In this manner, up to the point in time where the machine learning model is trained, a Boolean-logic type analysis may be conducted in step 705, and when a training data set with a predetermined number of applicants and results is formed for each respective lender 120, then the eligibility analysis in step 705 may switch to a machine-learning model type of analysis. Any such combination of Boolean logic or machine learning logic, as well as including both simultaneously at the same time, is envisioned in different embodiments.

Figure 4:
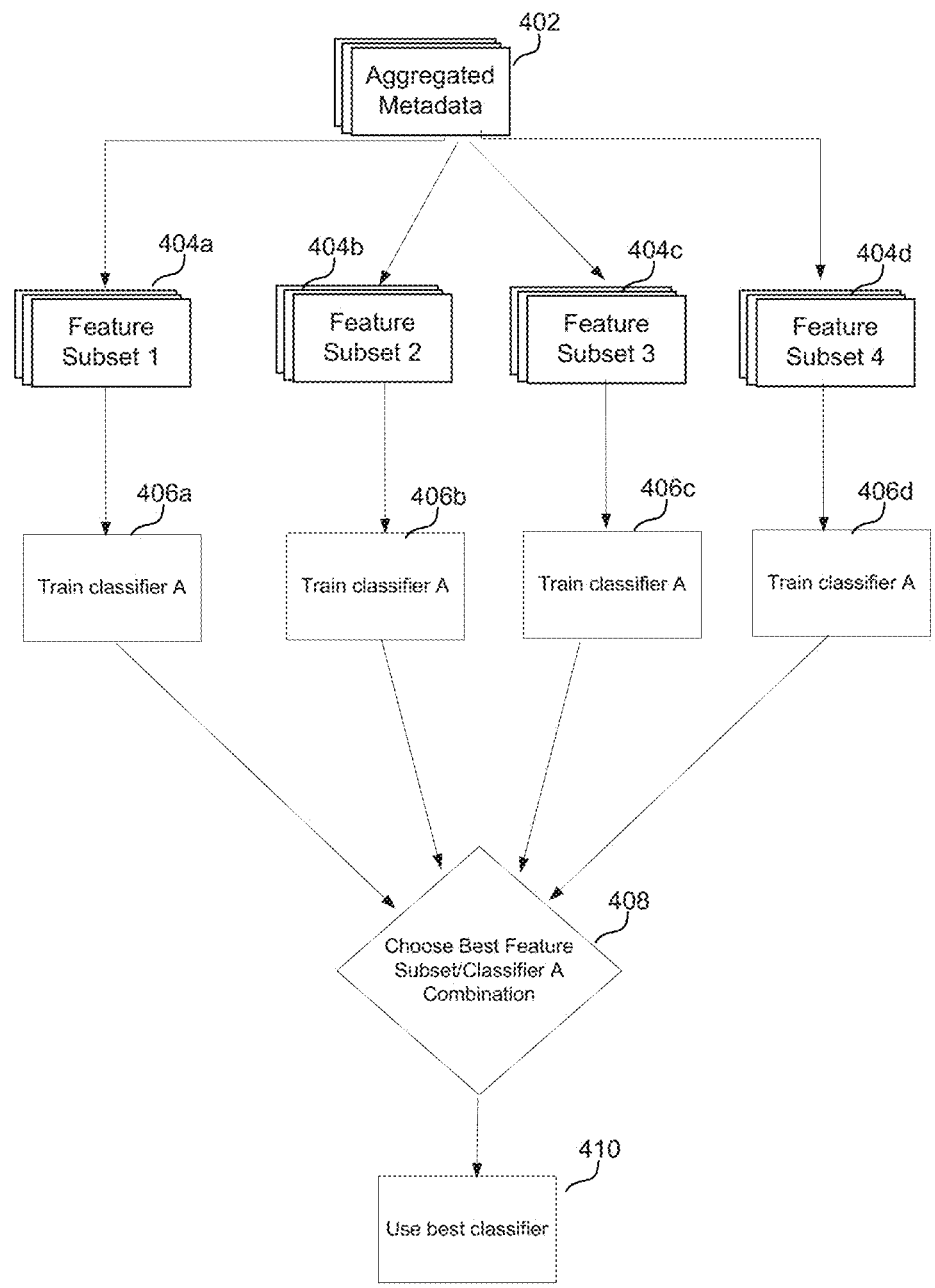
FIG. 4 is a block diagram showing an example of using aggregated metadata with varied feature selection to train a classifier used as part of marketplace client eligibility rules.

Machine learning techniques may be useful as a dataset is accumulated for multiple prospective buyers/applicants, and can capture the emerging trends associated with features. In particular, as shown in FIG. 4, from the aggregated metadata shown in 402, there may be a dimension reduction step at this later, which reduces the metadata to feature subsets (e.g.

credit score, geography). In addition, feature subsets, such as those shown in 404a-404d may also include other features which are not asked of the applicant but associated with applicant or lender information in the aggregated metadata 402 and can be determined (e.g. number of high net worth individuals within a ten-mile radius in the same geographic location as the applicant which received a YES result, number of rival lender companies located within a ten-mile radius of the lender geographic location for a lender 120, monthly weather in a geographic location of the applicant, etc.). A particular machine-learning technique, such as SVM, random-forest, decision trees, neural network, etc. may be chosen as ("classifier A") in elements 406a-406d. This same machine-learning technique may be used with each of the feature subsets 404a-404d independently, to form classifiers 406a-406d. Out of classifiers 406a-406d, each classifier may be independently trained using the data from the feature subsets 404a-404d with this machine-learning technique for a respective feature with respect to the applicant and lender results of YES/NO for particular lenders. In this way, features that have a direct impact on applicant eligibility in terms of receiving a positive or negative response can be identified. Furthermore, by having all of the feature subsets trained with the same machine learning technique, variability within different machine learning techniques can be eliminated.

Then, in step 408 examination of the trained machines 406a-406d, may be conducted to select the best trained machine. This selection may be performed by using k-fold cross-validation, distance measures, divergence, or other empirical mathematical criteria, etc. For k-fold cross-validation, for example, the aggregated meta-data may be shuffled and split into a k number of groups (e.g., 5 groups if k is 5). Then, for each unique group, the group can be held out as a test data set, with the remaining groups of aggregated metadata 402 being used to train the classifiers 406a-406d. Finally, based on the training, the accuracy with respect to the test group can be evaluated. This procedure can similarly be repeated for each unique group out of the k groups, and results can be pooled to indicate which of the classifiers 406a-406d is the most accurate in correlating feature subsets to actual applicant results with the machine learning technique A. Thus the best feature subset/classifier A combination may be chosen in step 408. There can be multiple classifiers A used, and each can be evaluated with respect to each feature subset. That is classifiers such as 406a-406d may exist for a plurality of machine learning techniques A. In this embodiment, all such subset/classifier combinations may be compared in decision step 408, in terms of accuracy, using k-fold cross validation tested across multiple classifier A's (e.g. in the 5 groups above, the one test group would be tested not only for classifiers 406a-406d with regard to one classifier A, but for classifiers 406a-406d for all such classifiers A together). Finally, in this manner, the best classifier may be chosen ultimately as the machine learning technique in 410, as shown in FIG. 4, and may be written into the eligibility rules repository 209b to be used during the eligibility analysis to be conducted in step 705.

In an embodiment, a neural network with hidden layers and backpropagation may be used as a machine learning classifier in the lender pre-screening criteria. By using such a classification technique, it may be possible from aggregated metadata of simple YES/NO responses with respect to changes in applicant criteria, to create a system of nodes with weights. This system of nodes with weights may be used in the lender pre-screening process to give a reliable prediction, based on prospective applicant data, whether a prospective applicant may be suitable for applying to a particular lender for financing (that is, whether it is likely that the lender 120 will give a YES, or a NO response to the applicant for prequalification or product eligibility). Based on this predictive analysis, wherein the machine learning logic of the neural network, including the system and nodes shown in e.g., FIG. 5A., may be written to the client rules repository 209b, may be run as the rules eligibility analysis in step 705. Accordingly, based on the prediction by such a technique, a decision for an applicant with respect to a particular lender 120 may be rendered in step 707, as explained above.

Figure 5A:
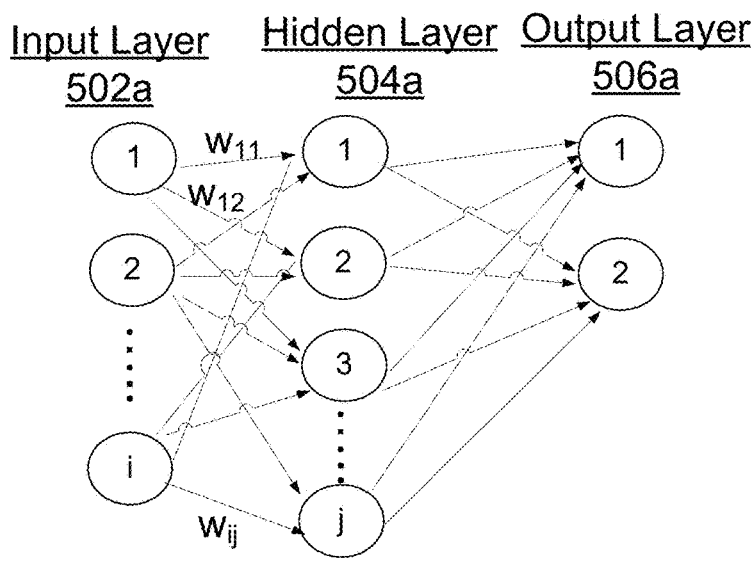
FIG. 5A is a block diagram showing an example of a neural network used as a machine learning classifier used as part of marketplace client eligibility rules.

The different components of the neural network model shown in FIG. 5A will herein be explained. The input layer 502A contains nodes 1 to i, which represent inputs into the model. Each of these nodes corresponds to a different input entered in by the applicant on GUI 1006 in step 703 of the lender-prescreening process. For example, node 1 may represent the annual salary of the applicant, node 2 may represent the applicant's geographic location, node 3 may represent the applicants credit score, and so on. Additionally, as with the features in the feature subsets 404a-404d described above, several input nodes may not be information inputted directly by the user, but features associated with information inputted by the user (e.g. number of high net worth individuals within a ten-mile radius in the same geographic location as the applicant, number of rival lender companies located within a ten-mile radius of the lender geographic location for a lender 120, monthly weather in a geographic location of the applicant, etc.). Output layer 506a may only include two nodes, node 1 and node 2. Node 1 may correspond to a result of 'YES' and node 2 may correspond to a result of 'NO' or vice versa, wherein based on the inputs and weights from each node to the other ($w_{ij}$ as shown in FIG. 5A), the results of the output layer are tabulated, and the node (1 or 2) in the output layer with the greater result is outputted as the outcome of the predictive analysis.

In traversing from the input layer 502A to the output layer 506A, there may also be several hidden layers 504A present. The number of hidden layers 504A may be preset at one or may be a plurality of layers. If the number of hidden layers 504A is one (such as shown in FIG. 5A), the number of neurons in the hidden layer may be calculated as the mean of the number of neurons in the input and output layers. This is derived from an empirically-based rule of thumb in ease of calculating weights across layers. According to an additional rule of thumb, in an embodiment to prevent overfitting, where the number of neurons in input layer 502A is $N_i$ and the number of neurons in the output layer is $N_o$, and the number of samples in the training data set, from the aggregated metadata is $N_s$, then the number of neurons $N_h$, in one hidden layer may be kept below $$N_h = \frac{N_s}{(\alpha * (N_i + N_o))}. \quad \text{(equation 1)}$$

In this manner, the number of free parameters in the model may be limited to a small portion of the degrees of freedom in the training data, in order to prevent overfitting.

From the input layer, based on the weights from each node in the input layer 502a to the hidden layer 504a shown in FIG. 5A, there may be a sigmoidal transfer function in going from the input layer 502a to the hidden layer 504a. Initially, the weights $w_{i,j}$ may be initialized to random values between 0 and 1. An input signal may then be propagated according to these weights (forward-propagation), wherein the hidden layer 504A forms the first outputs for the neurons of the input layer 502A. For example, inputs given as neuron 1 and 2 in the input layer 502A may be multiplied respectively by weights $w_{11}$ and $w_{12}$, respectively, and summed to form the output to the hidden layer 504A. Then the node 1 at the hidden layer 504A may take this net value (Value of Input Layer Node 1*$w_{11}$+Value of Input Layer Node 2*$w_{12}$) and transfer this activation value to see what the neuron output onwards to the output layer actually is. At each output layer (hidden layer 504A with respect to input layer 502A, and output layer 506A with respect to hidden layer 504A) transfer functions comprising the sigmoid activation function $$S(x) = \frac{1}{1+e^{-x}},$$

hyperbolic tangent function $$\tanh x = \frac{e^{2x}-1}{e^{2x}+1},$$

or smooth rectified linear unit (SmoothReLU) function $f(x)=\log(1+ex)$ may be used to transfer outputs.

In the example above, the output given from the input layer 502A to neuron 1 of the hidden layer 405A (Value of Input Layer Node 1*$w_{11}$+Value of Input Layer Node 2*$w_{12}$) would be inputted as the activation value to be transferred at the hidden layer 405A to one of the transfer functions described above, and the output would form the value of neuron 1 of the hidden layer 504A to be given onward as input to the output layer 506A, and multiplied by respective weights to the neurons 1 and 2 of the output layer. In this manner, full forward propagation of inputs 1 through I in the input layer 502a may be achieved to the output layer 506a.

Then, to conduct backpropagation, error is calculated between the expected outputs and the outputs forward propagated from the network. In training the neural network, k-fold cross validation, as described above, may be used. One group may be held for testing and the others may be used to train the model. In so training, a '1' value is reserved for neuron 1 and a '0' value is reserved for neuron 2 of the output layer 506A if the result is a 'YES' for applicant/product eligibility. Conversely a '0' value is reserved for neuron 1 and a '0' value is reserved for neuron 2 if the result is a 'NO' for applicant product eligibility. In this manner, error is calculated between the expected outputs of 1,0 so described, and the outputs actually forward propagated by the network (initially by random weights assigned as described above). To transfer the error, the error signal to propagate backwards through the network is given by error=(expected−output)*transfer_derivative(output), wherein transfer_derivative is the derivative of the transfer function used (sigmoid, hyperbolic, or SmoothReLU). The error signal for a neuron in the hidden layer 504A is then calculated as the weighted error of each neuron in the output layer, according to the weights from the output layer to the neuron in the hidden layer 504A. Similarly, the error signal from the hidden layer is then propagated back to the input layer 502A. Once the errors are calculated for each neuron in the network via the back propagation method described, the errors are used to update the weights according to the formula new_weight=old_weight+learning_rate*error*input. Here, the old_weight variable is the previous given weight in the model, the learning_rate variable is a value from 0 to 1 that specifies how much to change the old weight to correct for the error, the error variable is the error calculated by the backpropagation procedure, and the input variable is the value of the input that caused the error. Over time, this model can be developed to form a robust prediction analysis, and the rules governing its nodes, weights, and functions may be written in client rules repository 209a, such that it may be used in step 705 for eligibility rules analysis.

Figure 5B:
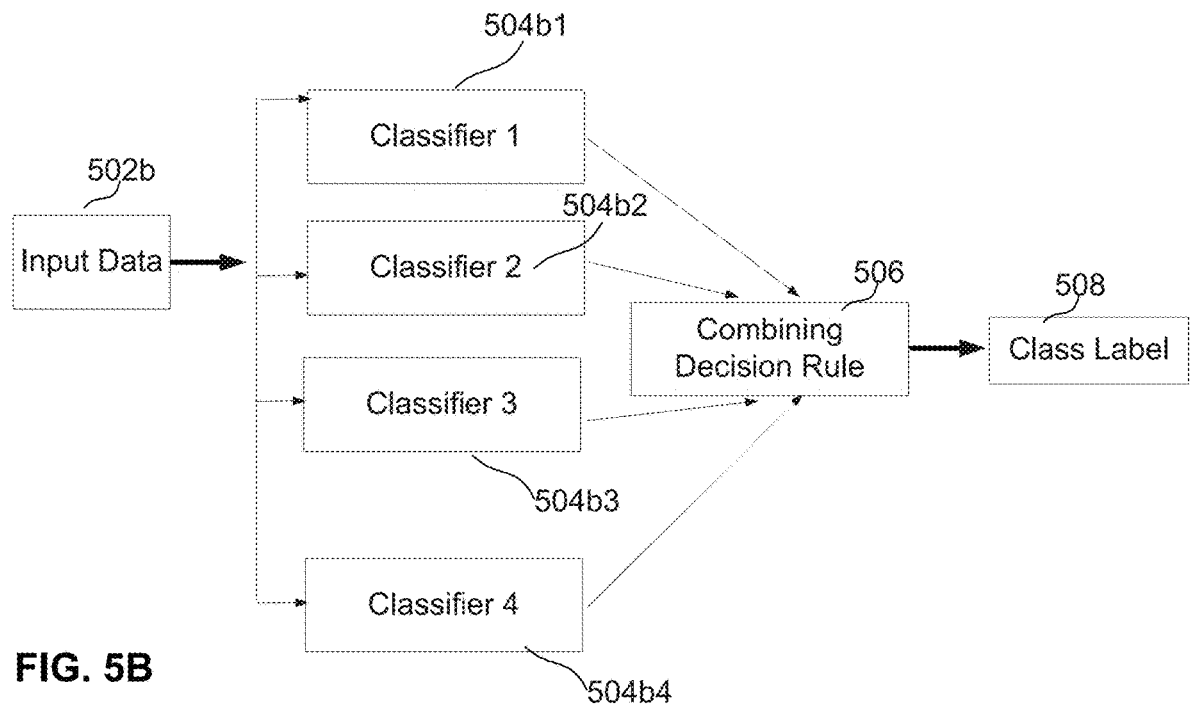
FIG. 5B is a block diagram showing an example of an ensemble machine learning classifier used as part of marketplace client eligibility rules.

Furthermore, multiple of the machine learning classifying techniques described above may be combined to form a composite machine learning classifier as shown in FIG. 5B. As shown in this figure the aggregated metadata, which forms the input data 502b, may be inputted into multiple different machine learning classifiers 504b1, 504b2, etc. A combining decision rule 506, which may combine votes from multiple classifiers, can then finally decide a class label (YES or NO for eligibility) in step 508, which can be returned as the outcome from the ensemble classifier. An example combining decision rule 506 may be a majority vote rule. Especially when models are equally well performing, such a combining decision rule can help balance out their individual weaknesses, and can make for a more robust classifier overall.

A reason the lender pre-screening criteria assessment may be conducted as a preliminary screening process, even before lender qualification, is to conserve computing resources while simultaneously acting as a first layer of screening to find suitable lenders for the prospective buyer. That is, pre-screening with less processor intensive rules up front can act as a first tier of screening to funnel a user to short-listed lenders. At a second-tier, which is more processor intensive, individual vehicles for said lenders may then be processed. Not only does such a tiered approach conserve computing resources, it is quicker, more efficient, and generates an overall positive experience for the user. In essence, even before undergoing lender prequalification, the user undergoes a prequalification provided by the administrator of the multi-lender architecture, which may be a marketplace client 207, in order to group lenders for which the user might have a higher chance of qualifying for together, so as to enhance user experience. In this manner, the prospect of a high probability of facing a rejection is pre-mitigated before the process of qualification in front of individual lenders is even attempted. This pre-empts user frustration occurring from being rejected by a lender, wherein the preserved customer goodwill may translate to return on investment. In the example where the product is a vehicle, for both dealers and lenders, this preserved customer goodwill can add value to both parties, as well as to the user, in the car purchasing process.

Under the lender pre-screening criteria, in addition to Boolean and/or machine learning logic being applied in the form of rule-sets to user information, the determination of when to eliminate a lender from the list of lenders that the user may apply to may also depend on an electronic score that is computed. This score may be computed from the subset of personal and financial information of the user assessed, wherein when the score is below a predetermined threshold, then the lender may be eliminated from the list of lenders being displayed. Alternatively, the UI may notify the user and give the user the option, even when the score for the user is below a predetermined threshold, to apply to the lender. This gives the user the option to over-ride the greying out or crossing out of the lender on the UI, if the user still wishes to apply to a particular lender, even knowing that they face a high probability of rejection of qualification. This may be useful in case the user has a preference for a particular lender. This action may take place, e.g., by double-clicking on the greyed out or crossed out lender entry in the UI. In this manner, full flexibility may be given to the user. This cascade-like manner of evaluation may also be used for the prequal, vehicle eligibility, and pricing microservices 108a, 108b, and 108c, respectively, as described infra.

In the Application Workflow step 311, the Vault 108 may process the pre-qualification, vehicle eligibility, and pricing information associated for assessing applicant eligibility, and if eligible, building a loan offer for multiple lenders, in parallel, using proprietary information provided by each lender. As described above, the Vault 108 may be a jailed environment, such that, while the lenders may provide their proprietary information for building a loan offer to be stored in the vault 108, the lenders or users may not access or view other lenders' proprietary information for building a loan offer. This configuration provides a technical advantage over conventional systems because this configuration is able to generate multiple loan offers from various lenders in parallel using each lender's proprietary information while maintaining a secure jailed environment that restricts access or visibility to the lenders' proprietary information.

As explained, the user may choose a desired vehicle in the inventory displayed in the Marketplace 201, within the Buyer UI 101 application interface, rendered on the GUI 1006. After choosing said product to obtain pricing information for a loan for an product, such as a vehicle, after the pre-screening criteria has been run, the Buyer UI 101 application may present a selection for requesting to getting pre-qualified for a pre-approved lender on the GUI 1006. Alternately, the Buyer UI 101 application may not display any inventory of products, and instead may ask the user to get pre-qualified first. In either case, in response to the user selecting the request for getting pre-qualified for a pre-approved lender or the Buyer UI 101 requiring the user to be pre-qualified, the Buyer UI 101 application may transition to receive input from the user associated with the user's personal and financial credentials information (e.g., name, address, bank accounts, annual income, employment history, social security number, liabilities, and/or the like). The Buyer UI 101 may encrypt the personal and financial information, and transmit the encrypted personal and financial information along with a prequalification request to the Multi-Lender Layer 105, via the Buy/Sell API 106. Alternatively, the Buy/Sell API 106 may collectively encrypt the personal and financial information and pre-qualification request, and transmit the encrypted personal information and pre-qualification request to the multi-lender layer 105.

The API Passthru 107 may receive the personal information of the user as well as the pre-qualification request from the Buy/Sell API 106, in the multi-lender layer 105. The personal and financial information may be encrypted in a lender-agnostic universal format, as described above. Such encryption may take place through protocols such as PGP, RSA, AES, 3DES, TLS SSH, IPsec, etc. The API Passthru 107 may be an API gateway. The API Passthru 107 may be an interface between APIs and micro-services (e.g., Prequalification 108a, Product Eligibility 108b, and Pricing 108c, through the lender router 116, as well as an interface between loan origination systems from Admin Lender AF 112 or a Third Party API 111, as will be explained infra). The API Passthru 107 may forward the encrypted personal and financial information along with the pre-qualification request to the lender router 116 in the Vault 108.

Figure 8:
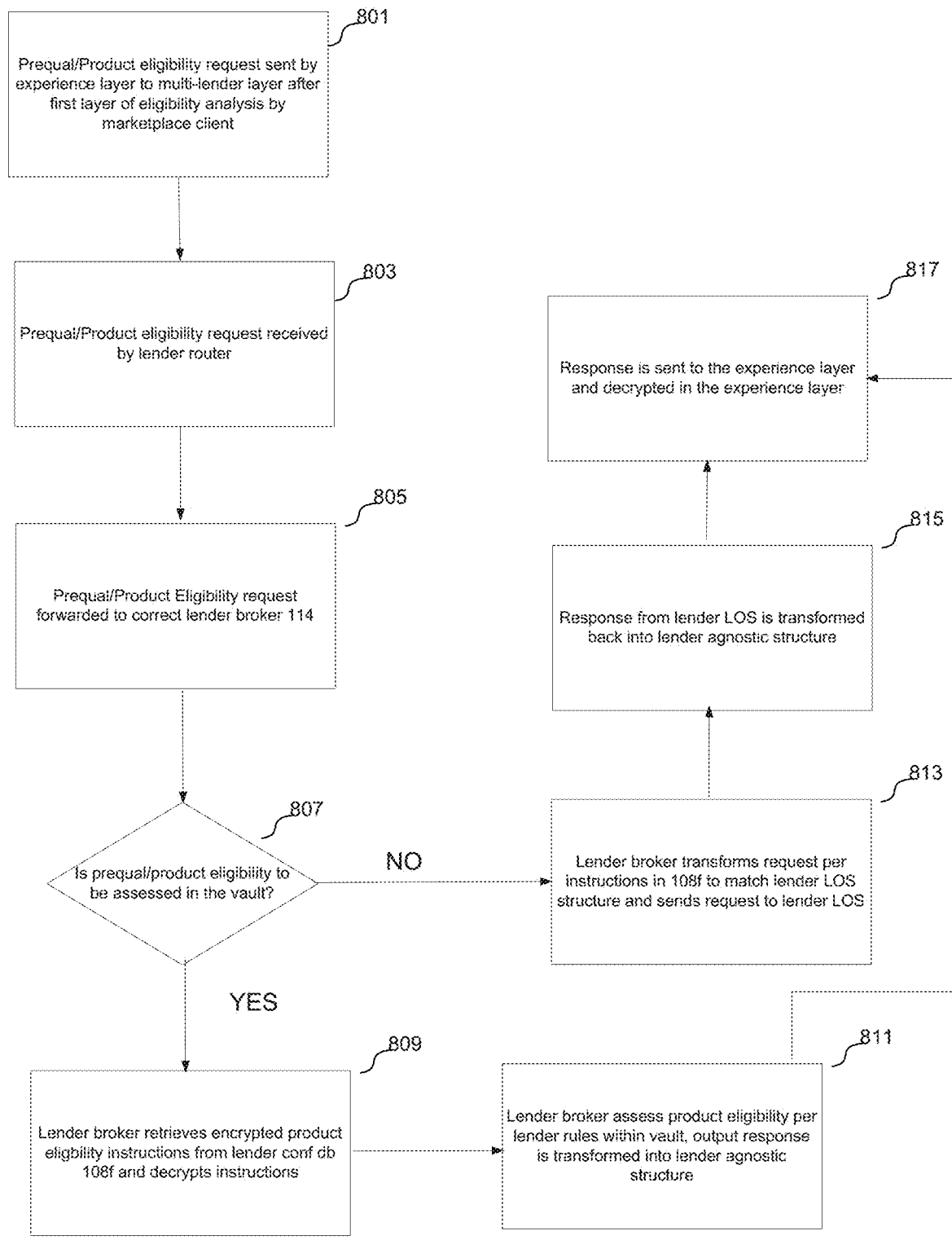
FIG. 8 is a flowchart showing the flow of how a prequalification or eligibility request is evaluated, as a second part of eligibility evaluation.

The process is shown in the flow chart of FIG. 8. As shown in FIG. 8, at step 801, this prequalification request may first be sent by the experience layer 104 to the multi-lender layer 105 via the API Passthru 107 after the lender pre-screening criteria has already been conducted based on rules set by a marketplace client 207, as described above, at step 303b of FIG. 3. Then, at step 803, the request is received from the API Passthru 107 within the vault 108 by the lender router 116. At step 805, the lender router 116 routs the request to the correct lender specific broker 114 within the vault 108, where there is a different lender-specific broker for each lender. For each lender for which the prequalification request is requested, a log entry would be made in the encrypted logs repository 108d using a lender specific key.

At step 807, once the prequalification request has been sent to the lender specific broker 114, there are two embodiments for subsequent steps of fulfilling the prequalification request. In one embodiment ("YES" at step 807), the lender prequalification is performed, as per inputted lender rules and executable logic in the Lender Confidential data repository 108f, in the vault itself. In this embodiment, in step 809, the lender specific broker 114, through the prequalification microservice 108a, retrieves the lender encrypted prequalification rules and/or executable logic from the Lender Confidential data repository 108f. Further, in step 809, the lender specific broker, through microservice 108a, may decrypt the encrypted personal information and pre-qualification request which has been encrypted in the lender-agnostic universal format. Then, using the specific lender key for the prequalification 108a microservice (e.g. 601a as described above), in step 811, the lender specific broker 114 may execute the Prequalification 108a micro-service per the decrypted lender rules and/or executable logic within the vault on the decrypted user information, and may re-encrypt the output of the microservice, using the encryption service 115 in FIG. 1, into one of the lender-agnostic universal formats described above.

In another embodiment ("NO" at step 807), instead of being performed in the vault 108, the lender prequalification may be performed by prequalification service within a third party lender loan origination system ("LOS") 111a using third party API 111. At step 813, the lender specific broker 114, through the prequalification microservice 108a, retrieves lender encrypted rules and/or executable logic not to perform the prequalification, as in the previous embodiment, but to transform the parameters of the prequalification request so that it may be inputted to the third party API 111 to be executed by the third party LOS 111a. At step 815, an output response is submitted from the third party lender LOS 111a back to the lender specific broker 114, as shown by the bidirectional arrow from the LOS 111a to the lender specific broker 114 in FIG. 1. This response may be encrypted with a key that the lender specific broker 114 has access to, in order to decrypt. At step 815, the lender specific broker 114 then decrypts the lender LOS 111a response and re-transforms the parameters to match the universal format of the Multi-Lender architecture (e.g. where it matches parameter-wise the output in step 811 of the other embodiment). Finally, at step 815, the output response after having its parameters re-transformed to match the universal format, is re-encrypted, using the encryption service 115 in FIG. 1, into one of the lender-agnostic universal formats described above.

In an analogous manner, following the steps of the flowchart of FIG. 8 for multiple lenders and corresponding lender specific brokers 114, the Prequalification microservices 108*a* for a plurality of these lender specific brokers 114 may be processed, in parallel, to determine the outcome of the user's pre-qualification request for each of the multiple lenders using the user's personal information and the lender-specific rules and executable logic associated with each respective lender, as detailed above. In general, when executing the Prequalification service 108*a* on user information, applicant eligibility has three factors which are considered by lenders 120. First, inputted user personal and financial information is checked against specific lender requirements, which may differ for each lender. If basic requirements for the lender have not been provided, or are not met, the Application results in an Auto Decline status as an output response for that lender, as shown in step 305 of FIG. 3, and that respective lender is removed for the vehicle being viewed in the Marketplace 201, displayed in the GUI 1006 of the Buyer UI 101 user interface.

If basic requirements for the lender are met, then the second factor assessed when executing the prequalification microservice (e.g. 108*a*) against provided user data is the applicant's credit score. Commonly accepted proprietary credit score models such as FICO, Equifax, Xperian, etc., may be used. In assessing the user's credit score, the Prequalification microservice (e.g. 108*a*) may interface with a third party service, querying external databases, such as, for example, that of Credit Bureaus 321, a lending terms database 323, a risk assessment database 325, or an employment confirmation database 327, wherein said interfacing may take place through an API call, external server FTP access, etc., to obtain information about the user's credit score, and may be reported in XML, SQL, or any other suitable format from the external database query. Example providers of external databases may include International Development Association, RiskView, WorkNumber, etc.

In an embodiment, the multi-platform architecture may be able to use a lender-provided connection to access the third party service, so as to ensure that data is routed through normal parties, and not re-routed through the multi-platform architecture. In this manner, the veracity of an unaltered credit report can be ensured with respect to a specific lender receiving that report, as opposed to the credit report being altered in any way due to a request made by the multi-platform architecture instead of the lender from the lender's own systems. Because each lender interacts with third-party services such as credit bureaus with lender-specific variables including lending history, size, type of clientele, etc., that may affect the magnitude of the score that is reported back, for assessing prequalification eligibility with respect to an applicant for a specific lender, it may be optimal to use a lender-provided connection to access the third party service 422. In addition, significant expense can be saved by the administrator of the multi-platform architecture by using existing agreements between particular lenders and third-party services for obtaining data.

The response from said third party service as part of step 813 or 811 in the embodiments described above may be received in the form of eXtensible Markup Language (XML), wherein the response XML may then populate in the lender prequalification application in repository 203 as an attribute. As described above, the Prequalification may be different for each lender. For example, each lender may require different thresholds of credit scores, where lenders may for example be only interested in customers with good credit above a threshold score. Third, based on the user's inputted address, the user's geographic presence is used to narrow lenders. For example, regional credit union bank lenders may only service specific zip-codes located within a limited geographic radius, or a specific state.

The Prequalification 108*a* micro-service may generate prequalification results, based on a designated score produced in step 813 or 811, which is then populated in the lender prequalification application in application repository 203, in response to processing the user's prequalification request for each of the multiple lenders. The prequalification results may include one or more multiple lenders which have pre-qualified the user for a product loan based on the personal information of the user, and the prequalification rules and/or executable logic associated with the respective lender. The prequalification results may be returned as a single or multiple payloads in the universally encrypted format from the vault as described above. In an embodiment, the prequalification results may also include pricing information associated with the loan such as a range of possible internet rates and terms and conditions of the loans which is returned in the pricing repository 202, wherein entries in the pricing repository 202 are temporarily stored in the pricing cache 206, before being entered in the pricing repository 202, wherein each entry in the pricing repository 202 is associated with an application in the application repository 203. Each of the pricing repository 202, application repository 203, offer repository 204, dealer repository 205, and marketplace 201 comprise a data structure such as a database comprising primary and/or secondary memory within a cloud computing environment, such as computing resources 1022 within environment 1020 as shown in FIG. 10, or other computing systems.

In an embodiment shown in FIG. 2, there may be a vault 210 similar to the vault 108 present in the multi-lender layer, wherein vault 210 may hold client rules in repository 209*b* for a plurality of marketplace clients 207. Such a vault would be similar in function to the described vault 108, wherein there would be separate components such as applications, pricing information, and offer databases 202-204 for every marketplace client 207, with different marketplace 201 and dealer 205 repositories as well. In such an embodiment, there may be different cloud environments 1020 for each separate marketplace client 207, or they may be pooled together into one cloud environment 1020 with separate dedicated resources 1022, etc. In addition, to make predictive models stronger across marketplace clients 207, YES/NO results that are used in training and building the rules used in pre-lender screening analysis may be shared and pooled across marketplace clients 207. That is, a model such as the neural network model described above may benefit from having aggregated metadata from several marketplaces, to form a larger training and k-fold cross validation set, which can strengthen and enhance the accuracy and predictability of the eligibility analysis performed in step 705 of FIG. 7. In another embodiment, such aggregated metadata may not be shared across marketplace clients 207 that do not want to cooperate in such a manner, and may be kept isolated in the vault structure 210, wherein the YES/NO results would be particular to the application repository 203 for particular marketplace clients 207. Finally, a security encryption key, as shown by the key figure in the repository for 209*b*, may be used accordingly to encrypt client rules, as well as application 203, pricing 202, offer 204, marketplace 201, and dealer 205 repositories, to keep data from different marketplace clients 207 isolated in a secure manner. Corresponding decryption keys for different marketplace clients 207 may be used by the Buy/Sell API for decryption of client rules, application information, pricing information, etc., in a corresponding manner, for display in the Buyer UI 101 interface, etc.

The Vault 108 may transmit the pre-qualification results, which are encrypted in a universal format by encryption service 115, from the lender specific broker 114 in the vault 108 (either directly or through lender router 116) to the API Passthru 107. The API Passthru 107 may in turn forward the universally encrypted prequalification results to the Buy/Sell API 106. The Buy/Sell API 106 may decrypt the encrypted prequalification results from the universally encrypted format, as described above, into an individual segregated user session in one of the user-facing applications such as the Buyer UI 101 application, to render the decrypted prequalification results on the Buyer UI 101 application GUI 1106.

The processing of the Prequalification results is a dynamic process. Of the factors considered for Applicant Eligibility by the Prequalification 108*a* microservice, per the rules selected by the respective lender, all may be considered together to narrow the list of prospective lenders that are deemed to be eligible for lending to the user, or each factor may be considered in turn. In either case, the list of eligible lenders that is displayed for a vehicle in the GUI 1006 of the Buyer UI 101 user interface is in turn dynamically and continuously updated according to the results of the Prequalification 108*a* processing. For example, the GUI 1006 may refresh with updated outcomes and information for prospective lenders, as well as an updated inventory of eligible products, every 45 seconds. As an additional example, when the credit score of the user is considered by the Prequalification 108*a* micro-service, the credit score is sent as an output from the service, and lender specific broker 114 as an XML result within the vault. The credit score may in turn be processed with other applicant variables in assessing prequalification within the prequalification 108*a* microservice. This may in turn produce a dynamically and continuously updated designated score at step 811 or 813, respectively, which may be sent as a lender-agnostic universally encrypted output response to the Experience Layer 104, and populated in the application repository 203 as part of a specific lender application. Finally, the lender prequalification application for a particular vehicle or product, or for all vehicles/products in general, depending on specific lender rules, may be thereby approved or declined based on the generated designated score in step 811 or 813 respectively, and this may be output in a lender-agnostic universally encrypted output response to the Experience Layer 104, and may affect the displaying of the dynamically updated available lenders in the GUI 1006 for a user-facing application such as the Buyer UI 101, as detailed above (e.g. greyed out if deemed ineligible, selectable and not greyed out if deemed eligible as an option 1024 in GUI 1006).

Within steps 811 or 813, such a designated score may be calculated from the applicant variables based on scoring algorithms such linear regression, linear approximation, as well as machine-learning based algorithms such as Support Vector Machines (SVM), neural networks, or other weighted matrix-based manipulation, including any combination of said algorithms. In the above example, if the credit score of the user is deemed to be below an eligible credit score threshold for several lenders, then based on the designated score dynamically populated, these lenders are dynamically eliminated from the list being displayed to the user in the Marketplace 301 being displayed in the GUI 1006 of the Buyer UI 101 user interface. This occurs through the two-way communication of Buyer UI 101, through the Buy/Sell API 106 and the API Passthru 107 gateway, and the communication of lender-agnostic output responses as shown in FIG. 6. Subsequent to the credit score evaluation, other applicant variables may be dynamically evaluated by steps 811 or 813, and the Marketplace 301 can be accordingly updated in the GUI of the Buyer UI 101 user interface to further shortlist and display only lenders for a vehicle which the user may be eligible to borrow from. The process for microservice 108*b* in determining product eligibility is analogous to that of applicant pre-eligibility in 108*a*, and follows the same steps shown in FIG. 8.

The prequalification microservice 108*a*, as described above, runs different lender instructions for each specific lender and reports results back in lender-specific formats throughout the process of evaluating applicant eligibility. To report such information back in the GUI 1006 in a lender-agnostic format, as described standardization occurs within the vault itself. For example, the individual microservices 108*a*-108*c*, which are one of the trusted and self-contained autonomous processes able to decrypt the individual lender rules and/or executable logic 108*f* associated with conducting prequalification on user data, are able to call the encryption service 115. The encryption service 115 is able to re-encrypt the output response into a non-lender-specific universal format.

This standardization results in end-to-end secure transmission of data, wherein the Buy/Sell API 106 may take encrypted information from the Vault 108, sent through the API passthru 107, and decrypt it such that a yes/no decision is autonomously rendered, entered in the Application repository 203, and shown to the user via GUI 1106. Standardization also occurs after the applicant has been deemed eligible, and the desired product of the applicant has also been deemed as eligible, by microservices 108*a* and 108*b* respectively. In this case, as described above, after microservices 108*a* and 108*b* have deemed an applicant to be eligible for financing for a particular product, Pricing microservice 108*c* runs on the applicant information attributes (either within the vault or within a third party LOS 111*a*) and the product information attributes. The pricing microservice 108*c* may further run based on lender-specific information including lender-specific algorithms for processing these applicant information and product information attributes. Pricing information may be determined in a lender-specific manner as shown in an analogous process in FIG. 9, and is also reported back in a non-lender-specific universal encrypted format.

This information too may be reported back in such a manner that the Buy/Sell API 106 can decrypt it to show to the user as part of the offer 204 repository, within the Marketplace 201 on the GUI 1006. In order to do so, there may be instructions for each lender contained in the lender confidential repository 108*f* to map to lender specific outputs and determine therefrom standard loan pricing information such as APR, loan term, loan conditions, monthly payment, prepayment penalties, balloon payments, and the like. These set categories of information are then encrypted, and sent in an encrypted manner from the vault, in an analogous manner as detailed above for prequalification microservice 108*a*, such that they are relayed by the API passthru 107 but cannot be read by the API passthru 107 as shown in FIG. 6. The API passthru 107 then relays the standardized encrypted information to the Buy/Sell API 106, where it may then be decrypted by the Buy/Sell API only within the offer repository 103, segregated by user session.

The prequalification results from, e.g. micro-services 108*a* or 108*b*, are rendered on the GUI 1006 of the Buyer UI 101 application, based on the approval/declining of the user with respect to the lenders assessed by corresponding lender specific brokers 114 in the vault 108. Based on these results of approved/declined, the eligible lenders remaining for vehicles/products being displayed in the Marketplace 201, the Buyer UI 101 application may receive a selection of a vehicle intended for purchase, from a user (via, e.g. a keyboard or mouse input on a GUI, etc.). Alternatively, as described above, the Buyer UI 101 application may receive a selection of a vehicle intended for purchase from the user at the same time as information is submitted for prequalification assessment to the Multi-Lender Layer 105, as described above.

In either case, whenever the selection of a product such as a vehicle intended for purchase from a user is received, the Buyer UI 101 application may encrypt the information associated with the selected vehicle/product (e.g., make, model, mileage, year, dealership, geographic location and/or the like) in the same universal encrypted non-lender-specific format, and transmit the information associated with the selected vehicle along with a product eligibility request to the multi-lender layer 105, via the Buy/Sell API 106 to the API passthru 107. The API Passthru 107 may receive the information associated with the selected vehicle of the user from the Buy/Sell API 106, in the multi-lender layer 105. The API Passthru 107 may forward the encrypted information associated with the selected vehicle to the Vault 108, along with a product eligibility request for a single lender or plurality of lenders (if the user has not yet been declined for the single lender or plurality of lenders). The Vault 108 may decrypt the encrypted information associated with the selected vehicle. The lender router 116, in step 801 of FIG. 8, may transmit the encrypted information associated with the selected vehicle and the product eligibility request to the corresponding lender specific broker 114. A process analogous to that of FIG. 8, for assessing product eligibility, per the attributes described above, follows.

The information associated with vehicle eligibility may be different for each lender. For example, each lender may have different requirements for attributes, such as for a vehicle, make, model, year, mileage, price, and/or the like. In this regard, the product eligibility 108*b* may determine certain desired vehicles by a user of the Buyer UI 101 user interface are not eligible for loans from given lenders. As a result of having clearly defined rules which are customizable by parties (dealers or lenders), the operation of the Prequalification 108*a* and the Vehicle Eligibility 108*b* micro-services serve to provide a mode of quick feedback compared to conventional solutions, and can significantly help a user in shortlisting prospective lenders for the purchase of a desired vehicle.

Furthermore, in an embodiment, none of the outputs of running lender rules are stored in the vault. In this embodiment, the user personal and financial information may be relayed to the vault, wherein it may be operated on by the prequal 108*a* microservice, the product eligibility 108*b* microservice, and the pricing 108*c* microservice, as per lender rules. In this process, the user information itself may or may not be stored in the vault. If stored, it may only be stored in a temporary manner, such that when the microservices complete operating on the user information, it is deleted before the processes are finished, and the outputs of the microservices are sent out of the vault. When the prequal 108*a* microservice, the vehicle eligibility 108*b* microservice, and the pricing 108*c* microservice have completed operating on the user data, the outputs of these services may be relayed back to the GUI 1006 in the Experience Layer 104, via first the lender specific broker 114 (either directly or through lender router 116) to the API passthru 107, and then from the API passthru 107 to the Buy/Sell API 106, and onwards to the offer generation process as explained infra. These outputs may be relayed back such that they are only decrypted within the individual user session, which no lender has access to. As a result, because such data may not be stored in the vault, and the outputs of such data are only visible to the user, the entire application is processed in an end-to-end secure manner.

The vault is able to function in this manner because of the way the API calling is structured relative to the microservices 108*a*, 108*b*, and 108*c* present in the vault. The API calling is driven by user action in the GUI 1006, wherein when the user chooses to explore the option of lending with a specific lender, then through the Buy/Sell API 106 a call is made to the API passthru 107, wherein an onwards call is made to the vault, wherein without accessing the vault internally, the prequalification, product eligibility, or pricing microservices 108*a*, 108*b*, and 108*c*, respectively, may be run depending on where the user is in the application flow in FIG. 3, as discussed earlier. As a result, due to the API calling protocol, the microservices inside of the vault are considered fully autonomous self-contained software, which may be executed for different third-party lenders, and which can potentially autonomously determine pricing information for an offer, and generate a loan. In this respect, with only indirect access present inside the vault, the vault is considered a truly self-executing and jailed environment which enables autonomous assessment of applicant prequalification, product eligibility, and subsequently, pricing, for multiple specific lenders, in parallel, and rapid reporting of results to the user, through the Buy/Sell API 106, as discussed above.

Subsequent to the vehicle eligibility results being rendered on the GUI of the Buyer UI 101 application, the Application 203 being worked on in the Marketplace 201 as displayed in the GUI of the Buyer UI 101 interface may be submitted to the Buy/Sell API 106. As described above, the application may be assessed according to lender-specific rules housed in the vault 108 in the lender confidential 108*e* repository by the Pricing 108*c* micro-service. Subsequently the pricing 108*c* micro-service would then send the encrypted results in the form of loan pricing terms, which may be communicated through the API passthru 107 back to the Buy/Sell API 106, wherein they may populate the fields of an offer in the offer repository 304 which may be displayed to the user in the GUI 1006 in the Buyer UI 101.

Finally, after the user is shown the offer in offer repository 204 in GUI 1006, as described above, and the user accepts the offer, the lender has two options to originate the loan from said offer. First, if there is an administrator or marketplace client 207 lender associated with the multi-lender architecture, then any specific lender can opt to use an administrator/marketplace client 207 provided API 112, and a loan origination system 112*a* within said administrator provided API 112, to generate the loan for the user. Alternatively, the specific lender is able to use their own third party lender API 111, which may comprise the specific lender's own loan origination system 111*a*, from which they may generate a loan for the Applicant. Such a system offers the flexibility for lenders to have options such as offer callbacks on their system, wherein manual evaluation and other steps may also take place, and the lender can respond at their leisure, seamlessly, through the API passthru 107 of the current system, wherein the offer callback would come through the third party lender API 111, through the API Passthru 107, and back to the buy/sell API 106, and finally back to the user through offer repository 204.

The structure of the Vault 108 will be explained in more detail. In particular, the self-contained software, in a blind manner, without the administrator of the multi-layer architecture being able to access the vault, evaluates the lender-specific requirements and eligibility rules from 108e and applies them to applicant-inputted information in the Pre-qualification step 108b, Vehicle Eligibility step 108a, and Pricing step 108c. After the assessment of the applicant's information is carried out under the provided lender-specific requirements and eligibility rules, the software produces encrypted output.

After the internal secure processes of the vault have run, the API Passthru 107 is able to access the outputs produced by the self-contained software (e.g. the eligible lenders an applicant may prequalify for, the type of vehicles which may be financed, and the pricing details such as APR) in an encrypted format, where the API Passthru 107 cannot read or interpret this encrypted data. The results are further passed back through the Multi-Lender Layer in this manner back to the Buy/Sell API in the Experience layer 104, which further passes the results back to the end-user interfaces of Buyer UI 101, Seller UI 102, or Digital Retailer 103 respectively, where the encrypted data cannot be read or interpreted. Information may be communicated from the multi-lender layer 105 to the Buyer UI 101, Seller UI 102, or Digital Retailer 103 applications through the Buy/Sell API 106, to be rendered the respective GUI. Finally, at the respective end-user interface, such as Buyer UI 101, Seller UI 102, or Digital Retailer 103, encrypted results are segregated by individual user session, wherein each such session is able to decrypt and display the contents of the encrypted outputs from the vault, to the user of said session, and thus inform a user of the lenders that they may be eligible to borrow under, the types of vehicles financed by said lenders that they may borrow for, as well as pricing-specific information such as the APR, loan term, and the like, of a prospective loan.

The underlying structure of a computer system 1100, shown in FIG. 11, can implement a database and the sending and receiving of data, and thus any of the data repositories mentioned above may be implemented by the structure of such a computer system. Computer system 1100 may include one or more processors (also called central processing units, or CPUs), such as a processor 1104. Processor 1104 may be connected to a communication infrastructure or bus 1106.

Computer system 1100 may be virtualized, or it may also include user input/output devices 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that is a specialized electronic circuit designed to process table data received from the lender confidential data repository 108f to implement rules and/or executable logic for execution of the microservices 108a-108c in parallel for a plurality of lender specific brokers 114 as well as populating the fields of the repositories in the experience layer 104 in FIG. 2, based on the results of the output of the microservices in the vault 108. Finally, the GPU may also aid in encrypting the output from the micro-services in the universal non-lender-specific format, as well as for transforming the request for a micro-service to match a third party API 111 parameters, and finally for transforming an output response from a third party API 111 back to the normal microservice 108a-108c parameters, and encrypt said output in the universal non-lender-specific format. When data is to be processed in a mass quantity, thus, and/or processed using the machine learning logic (which is described above), the GPU may have a parallel structure that is efficient for parallel processing of large blocks of data, such as mathematically intensive data.

Computer system 1100 can also include a main or primary memory 1108, such as random access memory (RAM). Main memory 1108 can include one or more levels of cache (including secondary cache).

Computer system 1100 can also include one or more secondary storage devices or memory 1110. Secondary memory 1110 may include, for example, a hard disk drive 1112 and/or a removable storage device or drive 1114, which may interact with a Raid array 1116, which may combine multiple physical hard disk drive components (such as SSD or SATA-based disk drives) into one or more logical units, or a removable storage unit 1118. Removable storage unit 1118 may include a computer usable or readable storage device having stored thereon computer software (control logic) and/or data, including remotely accessed network drives. Removable storage unit 1118 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. The components of the vault, such as the lender router 116, the lender specific broker 114, the lender analytic aggregator 108g, the audit service 117, the encryption service 115, and the Lender Confidential data service 108e may all be functions as described above that are self-executable or are in the form of modules which may be executed by a program, stored in primary and/or secondary memory of such a computer system. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote entities 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending or receiving data (e.g. between any of the third party LOS systems 111*a*, the administrator lender LOS system 112*a*, the vault 108, the experience layer 104, admin systems 401, external systems 402, etc. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Computer system 1100 may be a client or server, accessing or hosting any applications and/or data through any delivery paradigm, including but not limited to remote or distributed cloud computing solutions such as cloud computing environment 1020 which will be explained infra; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

The cloud computing environment 1020 may include computing resources 1022.

Each computing resource 1022 includes one or more personal computers, workstations, computers, server devices, or other types of computation and/or communication devices comprising primary and/or secondary memory, such as that of computing system 1100. The computing resource(s) 1022 may host the backend platform 1015. The cloud computing resources may include compute instances executing in the cloud computing resources 1022. The cloud computing resources 1022 may communicate with other cloud computing resources 1022 via wired connections, wireless connections, or a combination of wired or wireless connections.

Computing resources 1022 may include a group of cloud resources, such as one or more applications ("APPs") 1023-1, one or more virtual machines ("VMs") 1023-2, virtualized storage ("VS") 1023-3, and one or more hypervisors ("HYPs") 1023-4.

An application 1023-1 may include one or more software applications or programs that may be provided to or accessed by a computer system, such as web-based applications, web-based executables, web-based IDEs, etc. The application 1023-1 may include software associated with backend platform 1015 and/or any other software configured to be provided across the cloud computing environment 1020. The application 1023-1 may send/receive information from one or more other applications 1023-1, via one or more of the virtual machines 1023-2. Computing resources 1022 may be able to access each other's applications 1023-1 through virtual machines 1023-2, in this manner. The cloud computing environment 1020, hosted and executed by computing resources 1022, may communicate with the user facing applications via a network gateway 1030, using any of the various communication protocols and/or secure interfaces mentioned above.

Virtual machine 1023-2 may include a software implementation of a machine (e.g., a computer) that executes programs like a physical machine. Virtual machine 1023-2 may be either a system virtual machine or a process virtual machine. A system virtual machine may provide a complete system platform that supports execution of a complete operating system (OS). A process virtual machine may execute a single program and may support a single process. The virtual machine 1023-2 may execute on behalf of a user (e.g., the administrator of the multi-lender architecture) and/or on behalf of one or more other backend platforms 1015, and may manage infrastructure of cloud computing environment 1020, such as data management, synchronization, or long duration data transfers.

Virtualized storage 1023-3 may include one or more storage systems and/or one or more devices that use virtualization techniques within the storage systems or devices of computing resource 1022. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the architecture flexibility in how they manage storage for data from processing of data, and aid in hosting processing micro-services for various lenders, etc. File virtualization may eliminate dependencies between data accessed at a file level and location where files are physically stored. This manner of block and file virtualization may enable optimization of storage use, server consolidation, and/or performance of non-disruptive file migrations.

Hypervisor 1023-4 may provide hardware virtualization techniques that allow multiple operations systems (e.g., "guest operating systems") to execute concurrently on a host computer, such as computing resource 1022, which may include a computing system such as a server or personal computer, and can in this manner host a virtualized hardware of a user computing system. Hypervisor 1023-4 may present a virtual operating platform to the guest operating systems, and may manage multiple instances of a variety of operating systems as these "guest operating systems," which may share virtualized hardware resource, such as RAM, which may for instance access the data in the form of a database of any of the repositories mentioned in the multi-lender layer 105 or the experience layer 104 above. Alternately, secondary memory may be accessed using virtualized storage 1023-4, or on physical storage, such as a hard disk drive of a computing resource 1022 of the type of computing system as a server, personal computer, etc. In embodiments heretofore described, using a combination of RAM and secondary memory to access the database, such that a portion of the database may be in-memory and a portion of the database stored in files, may also be used.

Combinations and permutations of the above described embodiments, in any order/sequence, are envisioned to be encompassed by the present disclosure. In addition, data may be encrypted or decrypted at or within any layer, at any point along the flow of the Multi-Lender Architecture, as shown in FIG. 2. Repositories may comprise of data repositories such as a database or cluster of databases, data warehouse, cloud storage, data lake, and the like.

What is claimed is:

1. A method comprising:
encrypting, by one or more computing devices, a plurality of rule sets for prequalifying an applicant to be stored within a lender repository of a jailed environment on a server, wherein a respective rule set of the plurality of rule sets is output from each trained machine-learning model of a plurality of trained machine-learning models, wherein each trained machine-learning model of the plurality of trained machine-learning models is trained to generate rules for a respective lender of a plurality of lenders, wherein, based on the jailed environment, the respective rule set output by each trained machine-learning model of the plurality of trained machine-learning models is accessible to only the respective lender;
receiving a request to generate a prequalification result for a product based on applicant information;
for each lender of the plurality of lenders and responsive to the request to generate the prequalification result for the product based on the applicant information:
decrypting, within the jailed environment and based on a respective lender-specific key, the respective rule set,
generating, in parallel within the jailed environment, based on the respective rule set and the applicant information, a respective prequalification result, and
causing a client device to display an indication of the respective prequalification result.

2. The method of claim 1, further comprising determining that the applicant is suitable for borrowing from a lender of the plurality of lenders based on additional decision-making information and at least one of applicant preferences or filters applied by the applicant, wherein remaining lenders of the plurality of lenders are restricted from access to the additional decision-making information.

3. The method of claim 2, further comprising authorizing, based at least in part on the respective prequalification result for each lender of the plurality of lenders, the applicant for a transaction associated with the product.

4. The method of claim 1, wherein the applicant information further comprises an external record of a market source that the applicant traversed before reaching the server.

5. The method of claim 1, further comprising selecting the plurality of lenders from additional lenders to pre-qualify another applicant by:
applying a lender pre-screening rule set based on at least one of Boolean logic operators or machine-learning logic; and
updating the lender pre-screening rule set by updating at least one of the Boolean logic operators, applicant information thresholds, or the machine-learning logic based on the respective prequalification result for each lender of the plurality of lenders.

6. The method of claim 1, further comprising selecting the plurality of lenders from additional lenders to pre-qualify another applicant by:
applying the applicant information to a lender-specific neural network machine-learning classifier with back-propagation and at least one hidden layer, wherein user-provided information forms an input layer of the lender-specific neural network machine-learning classifier, and an output layer of the lender-specific neural network machine learning classifier contains two nodes, and wherein the another applicant is deemed to be suitable for borrowing from a particular lender of the plurality of lenders based on values of the two nodes.

7. The method of claim 6, further comprising updating the lender pre-screening rule set by adjusting weights between the two nodes or additional nodes of the lender-specific neural network machine-learning classifier based on the respective prequalification result for each lender of the plurality of lenders.

8. A system comprising:
a memory; and
a processor coupled to the memory, wherein the processor is configured to perform operations comprising:
encrypting, by one or more computing devices, a plurality of rule sets for prequalifying an applicant to be stored within a lender repository of a jailed environment on a server, wherein a respective rule set of the plurality of rule sets is output from each trained machine-learning model of a plurality of trained machine-learning models, wherein each trained machine-learning model of the plurality of trained machine-learning models is trained to generate rules for a respective lender of a plurality of lenders, wherein, based on the jailed environment, the respective rule set output by each trained machine-learning model of the plurality of trained machine-learning models is accessible to only the respective lender;
receiving a request to generate a prequalification result for a product based on applicant information;
for each lender of the plurality of lenders and responsive to the request to generate the prequalification result for the product based on the applicant information:
decrypting, within the jailed environment and based on a respective lender-specific key, the respective rule set,
generating, in parallel within the jailed environment, based on the respective rule set and the applicant information, a respective prequalification result, and
causing a client device to display an indication of the respective prequalification result.

9. The system of claim 8, the operations further comprising determining that the applicant is suitable for borrowing from the lender of the plurality of lenders based on additional decision-making information and at least one of applicant preferences or filters applied by the applicant, wherein remaining lenders of the plurality of lenders are restricted from access to the additional decision-making information.

10. The system of claim 9, the operations further comprising authorizing, based at least in part on the respective prequalification result for each lender of the plurality of lenders, the applicant for a transaction associated with the product.

11. The system of claim 8, wherein the applicant information further comprises an external record of a market source that the applicant traversed before reaching the server.

12. The system of claim 8, the operations further comprising selecting the plurality of lenders from additional lenders to pre-qualify another applicant by:
  applying a lender pre-screening rule set based on at least one of Boolean logic operators or machine-learning logic; and
  updating the lender pre-screening rule set by updating at least one of the Boolean logic operators, applicant information thresholds, or the machine-learning logic based on the respective prequalification result for each lender of the plurality of lenders.

13. The system of claim 8, the operations further comprising selecting the plurality of lenders from additional lenders to pre-qualify another applicant by:
  applying applicant information to a lender-specific neural network machine-learning classifier with backpropagation and at least one hidden layer, wherein user-provided information forms an input layer of the lender-specific neural network machine-learning classifier, and an output layer of the lender-specific neural network machine-learning classifier contains two nodes, and wherein the another applicant is deemed to be suitable for borrowing from a particular lender of the plurality of lenders based on values of the two nodes.

14. The system of claim 13, the operations further comprising updating the lender pre-screening rule set by adjusting weights between the two nodes or additional nodes of the lender-specific neural network machine-learning classifier based on the respective prequalification result for each lender of the plurality of lenders.

15. A non-transitory computer-readable medium storing instructions that, when executed by one or more processors of a device, cause the one or more processors to perform operations comprising:
  encrypting, a plurality of rule sets for prequalifying an applicant to be stored within a lender repository of a jailed environment on a server, wherein a respective rule set of the plurality of rule sets is output from each trained machine-learning model of a plurality of trained machine-learning models, wherein each trained machine-learning model of the plurality of trained machine-learning models is trained to generate rules for a respective lender of a plurality of lenders, wherein, based on the jailed environment, the respective rule set output by each trained machine-learning model of the plurality of trained machine-learning models is accessible to only the respective lender;
  receiving a request to generate a prequalification result for a product based on applicant information;
  for each lender of the plurality of lenders and responsive to the request to generate the prequalification result for the product based on the applicant information:
    decrypting, within the jailed environment and based on a respective lender-specific key, the respective rule set,
    generating, in parallel within the jailed environment, based on the respective rule set and the applicant information, a respective prequalification result, and causing a client device to display an indication of the respective prequalification result.

16. The non-transitory computer-readable medium of claim 15, wherein the operations further comprise determining that the applicant is suitable for borrowing from a lender of the plurality of lenders based on additional decision-making information and at least one of applicant preferences or filters applied by the applicant, wherein remaining lenders of the plurality of lenders are restricted from access to the additional decision-making information.

17. The non-transitory computer-readable medium of claim 16, wherein the operations further comprise authorizing, based at least in part on the respective prequalification result for each lender of the plurality of lenders, the applicant for a transaction associated with the product.

18. The non-transitory computer-readable medium of claim 15, wherein the applicant information further comprises an external record of a market source that the applicant traversed before reaching the server.

19. The non-transitory computer-readable medium of claim 15, wherein the operations further comprise selecting the plurality of lenders from additional lenders to pre-qualify another applicant by:
  applying a lender pre-screening rule set based on Boolean logic operators or machine-learning logic; and
  updating the lender pre-screening rule set by updating at least one of the Boolean logic operators, applicant information thresholds, or the machine-learning logic based on the respective prequalification result for each lender of the plurality of lenders.

20. The non-transitory computer-readable medium of claim 15, wherein the operations further comprise selecting the plurality of lenders from the additional lenders to pre-qualify another applicant by:
  Applying the applicant information to a lender-specific neural network machine-learning classifier with backpropagation and at least one hidden layer, wherein user-provided information forms an input layer of the lender-specific neural network machine-learning classifier, and an output layer of the lender-specific neural network machine-learning classifier contains two nodes, and wherein the another applicant is deemed to be suitable for borrowing from a particular lender of the plurality of lenders based on values of the two nodes.

* * * * *